(12) United States Patent
Lyu et al.

(10) Patent No.: US 10,680,776 B2
(45) Date of Patent: Jun. 9, 2020

(54) PILOT SIGNAL TRANSMISSION METHOD, BASE STATION, AND USER EQUIPMENT

(71) Applicant: Huawei Technologies Co., Ltd., Shenzhen (CN)

(72) Inventors: Yongxia Lyu, Ottawa-Kanata (CA); Zhiheng Guo, Beijing (CN); Wei Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 16/181,052

(22) Filed: Nov. 5, 2018

(65) Prior Publication Data

US 2019/0074950 A1    Mar. 7, 2019

Related U.S. Application Data

(63) Continuation of application No. PCT/CN2017/081356, filed on Apr. 21, 2017.

(30) Foreign Application Priority Data

May 13, 2016 (CN) .......................... 2016 1 0319060

(51) Int. Cl.
*H04W 4/00* (2018.01)
*H04L 5/00* (2006.01)
*H04W 56/00* (2009.01)

(52) U.S. Cl.
CPC ............ *H04L 5/0051* (2013.01); *H04L 5/005* (2013.01); *H04L 5/0042* (2013.01);
(Continued)

(58) Field of Classification Search
CPC ..... H04L 5/0092; H04L 5/0042; H04L 5/005; H04L 5/0051; H04L 5/0053; H04L 5/0064; H04W 48/12; H04W 56/001
See application file for complete search history.

(56) References Cited

U.S. PATENT DOCUMENTS

| 10,271,316 B2* | 4/2019 | Nogami | H04W 72/0413 |
| 2013/0163569 A1* | 6/2013 | Lee | H04L 1/0045 370/336 |

(Continued)

FOREIGN PATENT DOCUMENTS

| CN | 102740463 A | 10/2012 |
| CN | 104080174 A | 10/2014 |

(Continued)

OTHER PUBLICATIONS

Ku et al, Resource Allocation and Link Adaptation in LTE and LTE Advanced: A Tutorial, IEEE, 29 pages, 2015.*

(Continued)

*Primary Examiner* — Frank Duong
(74) *Attorney, Agent, or Firm* — Slater Matsil, LLP

(57) ABSTRACT

This application provides a pilot signal transmission method, a base station, and user equipment. A dedicated demodulation pilot signal and a common demodulation pilot signal in a TTI may be configured on different resource blocks of the TTI. The method in embodiments of the present invention includes: determining, by a base station, a resource location that is in a TTI and that is used to send a pilot signal, where the pilot signal includes a common demodulation pilot signal and a dedicated demodulation pilot signal, and the dedicated demodulation pilot signal and the common demodulation pilot signal are located on different resource blocks of the TTI; and sending, by the base station, the pilot signal at the resource location used to send the pilot signal.

15 Claims, 6 Drawing Sheets

(52) U.S. Cl.
CPC .......... *H04L 5/0053* (2013.01); *H04L 5/0064* (2013.01); *H04L 5/0092* (2013.01); *H04W 56/001* (2013.01)

(56) References Cited

U.S. PATENT DOCUMENTS

| | | |
|---|---|---|
| 2014/0016597 A1 | 1/2014 | Zhang et al. |
| 2016/0270059 A1 | 9/2016 | Chen et al. |
| 2017/0149543 A1* | 5/2017 | Ang ................... H04L 5/0007 |

FOREIGN PATENT DOCUMENTS

| | | |
|---|---|---|
| CN | 104104492 A | 10/2014 |
| CN | 107409030 A | 11/2017 |
| WO | 2013133608 A1 | 9/2013 |
| WO | 2016148789 A1 | 9/2016 |
| WO | 2017091384 A1 | 6/2017 |
| WO | 2017176433 A1 | 10/2017 |

OTHER PUBLICATIONS

NTT Docomo, Inc., "DL channel designs for shortened TTI," 3GPP TSG RAN WG1 Meeting #84bis, R1-163171, Busan, Korea, Apr. 11-15, 2016, 8 pages.

LG Electronics, "Time/Frequency resource of sPDCCH and sPDSCH," 3GPP TSG RAN WG1 Meeting #84bis, R1-162506, Busan, Korea, Apr. 11-15, 2016, 10 pages.

Huawei et al., "Discussion on DL DMRS for short TTI," 3GPP TSG RAN WG1 Meeting #84bis, R1-162113, Busan, Korea, Apr. 11-15, 2016, 6 pages.

\* cited by examiner

PILOT SIGNAL TRANSMISSION METHOD, BASE STATION, AND USER EQUIPMENT

CROSS-REFERENCE TO RELATED APPLICATIONS

This application is a continuation of International Application No. PCT/CN2017/081356, filed on Apr. 21, 2017, which claims priority to Chinese Patent Application No. 201610319060.9, filed on May 13, 2016. The disclosures of the aforementioned applications are hereby incorporated by reference in their entireties.

TECHNICAL FIELD

Embodiments of the present invention relate to the field of communications technologies, and in particular, to a pilot signal transmission method, a base station, and user equipment.

BACKGROUND

In a Long Term Evolution (LTE) system or a Long Term Evolution Advanced (LTE-A) system, an uplink symbol is referred to as a single carrier frequency division multiple access (SC-FDMA) symbol, and a downlink symbol is referred to as an orthogonal frequency division multiplexing (OFDM) symbol. If an uplink multiple access mode of orthogonal frequency division multiple access (OFDMA) is introduced into a subsequent technology, the uplink symbol may also be referred to as an OFDM symbol. The uplink symbol and the downlink symbol are collectively referred to as a symbol.

From a perspective of a time dimension, a time length of one radio frame is 10 milliseconds (ms), a time length of one subframe is 1 ms, and one radio frame includes 10 subframes. There are two subframe formats. One format is a normal cyclic prefix (NCP) subframe format. One NCP subframe includes 14 symbols or two slots (a time length of one slot is 0.5 ms). The symbols are numbered from 0 to 13, symbol 0 to symbol 6 are even-numbered slots, and symbol 7 to symbol 13 are odd-numbered slots. The other subframe format is an extended cyclic prefix (ECP) subframe format. One ECP subframe includes 12 symbols or two slots. The symbols are numbered from 0 to 11, symbol 0 to symbol 5 are even-numbered slots, and symbol 6 to symbol 11 are odd-numbered slots. From a perspective of a frequency dimension, a smallest unit is a subcarrier. A subcarrier spacing in the LTE system is 15 kHz. A subcarrier spacing in a 5G communications system may change, and may be a multiple of 15 kHz, for example, 15 kHz, 30 kHz, or 60 kHz.

From a perspective of both the time dimension and the frequency dimension, a smallest unit of a resource used for communication antenna port transmission is a resource element (RE). One RE includes one symbol in time domain and one subcarrier in frequency domain. A resource element group (REG) may include an integral quantity of REs. For example, one REG may include 4 or 16 REs. One physical resource block (PRB) includes one slot in time domain and 12 subcarriers in frequency domain. One subframe includes one PRB pair. One resource block (RB) includes one subframe in time domain and 12 subcarriers in frequency domain. A resource block group (RBG) may include an integral quantity of PRBs. For example, one RBG may include one, two, three, or four PRBs, or another integral quantity of PRBs.

In the LTE system, a physical channel is used to transmit data information and/or control information. The physical channel includes one or a combination of the following: a physical uplink shared channel (PUSCH), a physical uplink control channel (PUCCH), a physical downlink control channel (PDCCH), an enhanced physical downlink control channel (EPDCCH), a physical control format indicator channel (PCFICH), a physical hybrid automatic repeat request indicator channel (PHICH), a physical downlink shared channel (PDSCH), and the like, or is a channel that is newly introduced in an existing communications standard and that has a same function but has a different name, such as a control channel or a data channel introduced in short transmission time interval (TTI) transmission. PDSCHs/PUSCHs in LTE all are shared channels, and a TTI is defined as 1 ms, to be specific, a length of one subframe. A base station performs one time of user scheduling in each TTI (or each 1 ms), and scheduled user data needs to be sent in each TTI. In addition to being defined as 1 ms, the TTI may be of another length. For example, a length of a TTI in the 5G communications system may change, and the length of the TTI may be 125 μs, 250 μs, 500 μs, 750 μs, or 1 ms.

A pilot signal in the LTE system includes a common demodulation reference signal (CRS), a downlink demodulation reference signal (DL DMRS), an uplink demodulation reference signal (UL DMRS), a channel state information-reference signal (CSI-RS), a positioning pilot signal (PRS), a primary synchronization signal (PSS), a secondary synchronization signal (SSS), a discovery pilot signal (DRS), and a sounding reference signal (SRS). The CRS is used for downlink channel estimation, and is used for coherent detection and demodulation by user equipment. The DL DMRS and the UL DMRS are used for data demodulation. Both the CRS and the DL DMRS are downlink reference signals. The UL DMRS is an uplink reference signal. A difference between the CRS and the DL DMRS lies in that the CRS does not include precoding information, but precoding may be performed on the DL DMRS. The CSI-RS is mainly used for downlink channel measurement, and the SRS is mainly used for uplink channel measurement. The PRS is mainly used for positioning measurement. The PSS is mainly used to help the user equipment implement symbol timing and frequency synchronization, and is combined with the SSS to help the user equipment identify a cell identity (ID). The DRS is a pilot channel similar to a synchronization channel in the LTE system, and may carry information such as the cell ID, but time domain density of the DRS is significantly lower than that of the synchronization channel, and a time domain interval may reach a magnitude of seconds. After a small cell is disabled, the small cell still periodically sends a DRS. Because of sparsity of the DRS, the DRS has little impact on power consumption and interference. The user equipment always searches for a DRS during movement. If the DRS is detected, it indicates that the user equipment has entered coverage of a small cell, and the user equipment may further enable a mechanism such as uplink paging to wake up the small cell to serve the user equipment.

When data is transmitted between the base station and the user equipment, in the TTI, the UL DMRS and the DL DMRS are used as dedicated demodulation pilot signals. The CRS is used as a common demodulation pilot signal. The CSI-RS and the SRS are used as measurement pilot signals. Additionally, the PSS, the PRS, the SSS, and the DRS are used as positioning and/or synchronization pilot signals. Each PRB of each TTI includes a CRS, and the CRS exists in full bandwidth.

FIG. 1 is a pattern of a pilot signal that is in a TTI and that is sent by a base station to user equipment in a current system. Only a CRS in FIG. 1 is analyzed to obtain a pattern on the left side of FIG. 2. A PRB with a normal cyclic prefix (Normal CP) includes seven symbols, and a PRB with an extended cyclic prefix (Extended CP) includes six symbols. A pilot symbol carries a pilot signal. If different transmit antenna ports of a same base station separately transmit pilot signals and data at the same time, receiving the pilot signals by the user equipment is interfered with. To avoid such a case, when a transmit antenna port transmits a pilot signal, other transmit antenna ports of the same base station vacate corresponding time-frequency resources. For example, in FIG. 1, when an antenna 0 transmits a pilot signal (to be specific, a pilot symbol R0 of the antenna 0 carries the pilot signal), an antenna 1, an antenna 2, and an antenna 3 do not transmit pilot signals or data (to be specific, a pilot symbol R1 of the antenna 1, a pilot symbol R2 of the antenna 2, and a pilot symbol R3 of the antenna 3 do not carry the pilot signals or the data). In addition, an absolute location of a pilot subcarrier in frequency domain is related to a cell ID, that is, a pilot subcarrier in which a pilot symbol is located in FIG. 2 does not change in a same cell.

Only the CRS is analyzed above. When there is data to be transmitted in the TTI, the dedicated demodulation pilot signal necessarily exists in the TTI. It can be learned from FIG. 1 that, when there is data to be transmitted in the TTI, a physical resource block of each resource block includes a common demodulation pilot signal and a dedicated demodulation pilot signal. In addition, the TTI further includes another type of pilot signal. Consequently, each resource block of the TTI is filled with pilot symbols, and the foregoing interference problem of the pilot signal needs to be considered. If a pilot port of the base station is extended, a new pilot port needs to occupy a non-pilot symbol as a pilot symbol, and therefore it is difficult to extend a new pilot port in a communications system.

SUMMARY

This application provides a pilot signal transmission method, a base station, and user equipment. A dedicated demodulation pilot signal and a common demodulation pilot signal in a TTI may be configured on different resource blocks of the TTI, thereby reducing a quantity of pilot symbols in the TTI, and facilitating extension of a pilot port in a communications system.

A first aspect of embodiments of the present invention provides a pilot signal transmission method. The method includes determining, by a base station, a resource location that is in a TTI and that is used to send a pilot signal. The pilot signal includes a common demodulation pilot signal and a dedicated demodulation pilot signal. The dedicated demodulation pilot signal and the common demodulation pilot signal are located on different resource blocks of the TTI. The method further includes sending, by the base station, the pilot signal at the resource location used to send the pilot signal.

When the base station and user equipment in a communications system transmit data, before sending the pilot signal (including the common demodulation pilot signal and the dedicated demodulation pilot signal) to the user equipment, the base station needs to first determine the resource location for the pilot signal in the TTI. The dedicated demodulation pilot signal and the common demodulation pilot signal are located on different resource blocks of the TTI. Then, the base station sends the pilot signal at the determined resource location used to send the pilot signal. A rule of determining, by the base station, the resource location that is in the TTI and that is used to send the pilot signal may be known by both the base station and the user equipment. Alternatively, the rule is notified to the user equipment before the base station sends the pilot signal, so that the user equipment can receive the pilot signal. In a current system, each resource block of the TTI includes the common demodulation pilot signal and the dedicated demodulation pilot signal. However, in this embodiment of the present invention, any resource block of the TTI includes either the common demodulation pilot signal or the dedicated demodulation pilot signal. Therefore, when a resource block includes a pilot symbol including the dedicated demodulation pilot signal, the resource block does not include a pilot symbol including the common demodulation pilot signal. In this way, an original pilot symbol including the common demodulation pilot signal in the resource block becomes a non-pilot symbol, and a quantity of non-pilot symbols increases. This is conducive to extension of a pilot port.

In a possible design, the TTI includes a first resource block. The first resource block includes the common demodulation pilot signal but does not include the dedicated demodulation pilot signal. The method further includes configuring, by the base station, before the sending the pilot signal at the resource location, frequency band bandwidth in which the common demodulation pilot signal is located in the first resource block. The configuring causing the frequency band bandwidth, in which the common demodulation pilot signal is located, to be less than system frequency band bandwidth of the TTI.

In a current system, the common demodulation pilot signal exists in full bandwidth, to be specific, common pilot exists on each resource block of the full bandwidth. Therefore, before sending the common demodulation pilot signal, the base station configures the frequency band bandwidth in which the common demodulation pilot signal is located in the first resource block, so that the frequency band bandwidth in which the common demodulation pilot signal is located is less than the system frequency band bandwidth of the TTI. In this way, the common demodulation pilot signal occupies only some resource blocks of the TTI. To be specific, first resource blocks are reduced when compared with those in a current system, a quantity of resource blocks that does not include the common demodulation pilot signal increases. This is conducive to flexible use of a frequency band resource and extension of a pilot port.

In a possible design, the first resource block further includes a synchronization pilot signal. The method further includes, determining, by the base station, before the sending the pilot signal at the resource location, resource locations that are in the first resource block and that are used to send the common demodulation pilot signal and the synchronization pilot signal. The common demodulation pilot signal and the synchronization pilot signal are located on different symbols of the first resource block. The synchronization pilot signal is located after the common demodulation pilot signal.

Both the common demodulation pilot signal and the synchronization pilot signal are cell-level pilot signals, and the common demodulation pilot signal and the synchronization pilot signal are on a same resource block. When the first resource block includes the synchronization pilot signal and the common demodulation pilot signal, and before sending the pilot signal, the base station determines the resource locations for the common demodulation pilot signal and the synchronization pilot signal in the first resource block. The synchronization pilot signal is located after the common demodulation pilot signal. However, in a current system, the common demodulation pilot signal is in full bandwidth, and the synchronization pilot signal is located on six intermediate PRBs of the system bandwidth. Therefore, compared with a current system, in this embodiment of the present invention, there are more resource blocks that do not include a cell-level pilot signal, and this is more conducive to extension of a pilot port. In addition, the common demodulation pilot signal is used for channel estimation, and therefore the common demodulation pilot signal is located before the synchronization pilot signal.

In a possible design, the first resource block further includes a measurement pilot signal. The method further includes determining, by the base station, before the sending the pilot signal at the resource location, resource locations that are in the first resource block and that are used to send the common demodulation pilot signal and the measurement pilot signal. The common demodulation pilot signal and the measurement pilot signal are located on different symbols of the first resource block. The measurement pilot signal is located after the common demodulation pilot signal.

When the first resource block includes the measurement pilot signal and the common demodulation pilot signal, and before sending the pilot signal, the base station determines the resource locations for the common demodulation pilot signal and the measurement pilot signal in the first resource block. The common demodulation pilot signal and the measurement pilot signal are located on different symbols of the first resource block. However, in a current system, the common demodulation pilot signal and the synchronization pilot signal may be on a same symbol. Therefore, compared with a current system, in this embodiment of the present invention, a quantity of available subcarriers of a same pilot signal on a same symbol increases, and this is more conducive to extension of a pilot port. In addition, the common demodulation pilot signal is used for channel estimation, and therefore the common demodulation pilot signal is located before the measurement pilot signal.

In a possible design, the first resource block further includes a positioning pilot signal. The method further includes, determining, by the base station, before the sending, the pilot signal at the resource location, resource locations that are in the first resource block and that are used to send the common demodulation pilot signal and the positioning pilot signal. The common demodulation pilot signal and the positioning pilot signal in the first resource block are located on different symbols of the first resource block.

When the first resource block includes the positioning pilot signal and the common demodulation pilot signal, and before sending the pilot signal, the base station determines the resource block for the common demodulation pilot signal and the positioning pilot signal in the first resource block. The common demodulation pilot signal and the positioning pilot signal are located on different symbols of the first resource block. However, in a current system, the common demodulation pilot signal and the positioning pilot signal may be on a same symbol. Therefore, compared with a current system, in this embodiment of the present invention, a quantity of available subcarriers of a same pilot signal on a same symbol increases, and this is more conducive to extension of a pilot port.

In a possible design, the TTI includes a second resource block. The second resource block includes the dedicated demodulation pilot signal but does not include the common demodulation pilot signal. The second resource block further includes a measurement pilot signal. The method further includes, determining, by the base station, before the sending the pilot signal at the resource location, resource locations that are in the second resource block and that are used to send the dedicated demodulation pilot signal and the measurement pilot signal. The dedicated demodulation pilot signal and the measurement pilot signal are located on different symbols of the second resource block. The measurement pilot signal is located after the dedicated demodulation pilot signal.

Both the second resource block and the first resource block are resource blocks of the TTI, and the second resource block and the first resource block are different resource blocks. When the second resource block includes the measurement pilot signal and the dedicated demodulation pilot signal, and before sending the pilot signal, the base station determines the resource locations for the dedicated demodulation pilot signal and the measurement pilot signal in the second resource block. The dedicated demodulation pilot signal and the measurement pilot signal are located on different symbols of the second resource block. However, in a current system, the dedicated demodulation pilot signal and the measurement pilot signal may be on a same symbol. Therefore, compared with a current system, in this embodiment of the present invention, a quantity of available subcarriers of a same pilot signal on a same symbol increases, and this is more conducive to extension of a pilot port. In addition, the dedicated demodulation pilot signal is used for channel estimation. Therefore, to reduce a data demodulation delay, the dedicated demodulation pilot signal is located at the front of the TTI, and the dedicated demodulation pilot signal is located before the measurement pilot signal.

In a possible design, the dedicated demodulation pilot signal is divided into a first part and an $L^{th}$ part. L is a positive integer that is not less than 2. The measurement pilot signal is located after the first part of the dedicated demodulation pilot signal.

In some scenarios such as a high-speed scenario, a quantity of symbols for the dedicated demodulation pilot signal may increase. To be specific, the dedicated demodulation pilot signal may be divided into the first part and the $L^{th}$ part. The first part of the dedicated demodulation pilot signal is used for channel estimation, and the $L^{th}$ part of the dedicated demodulation pilot signal assists with channel estimation. Therefore, the measurement pilot signal needs to be located after the first part of the dedicated demodulation pilot signal, and the $L^{th}$ part of the dedicated demodulation pilot signal may be located between the first part of the dedicated demodulation pilot signal and the measurement pilot signal, or may be located after the measurement pilot signal.

In a possible design, the second resource block further includes a positioning pilot signal. The method further includes determining, by the base station, after the determining resource locations that are in the second resource block, a resource location for the positioning pilot signal. The positioning pilot signal, the dedicated demodulation pilot signal, and the measurement pilot signal are located on different symbols. The positioning pilot signal is located after the dedicated demodulation pilot signal and the measurement pilot signal.

When the second resource block includes the measurement pilot signal and the dedicated demodulation pilot signal, and further includes the positioning pilot signal, the resource location for the positioning pilot signal is determined after the resource locations for the dedicated demodulation pilot signal and the measurement pilot signal are determined and before the base station sends the dedicated demodulation pilot signal and the measurement pilot signal. The positioning pilot signal, the dedicated demodulation pilot signal, and the measurement pilot signal are located on different symbols. Compared with a current system, in this embodiment of the present invention, a quantity of available subcarriers of a same pilot signal on a same symbol increases, and this is more conducive to extension of a pilot port of the base station. The positioning pilot signal is located after the dedicated demodulation pilot signal and the measurement pilot signal.

A second aspect of embodiments of the present invention provides a pilot signal transmission method. The method includes determining, by user equipment, a resource location that is in a TTI and that is used to send a pilot signal. The pilot signal includes a common demodulation pilot signal and a dedicated demodulation pilot signal. The dedicated demodulation pilot signal and the common demodulation pilot signal are located on different resource blocks of the TTI. The method further includes receiving, by the user equipment, the pilot signal based on the resource location used to send the pilot signal.

In a communications system, if the user equipment is required to receive the pilot signal sent by a base station, the user equipment needs to learn, in advance, the resource location that is determined by the base station and that is used to send the pilot signal in the TTI. A rule of determining, by the base station, the resource location used to send the pilot signal may be known by both the base station and the user equipment, or before sending the pilot signal, the base station notifies, to the user equipment, the resource location used to send the pilot signal. After determining the resource location that is in the TTI and that is used to send the pilot signal, the user equipment may receive the pilot signal sent by the base station. In a current system, each resource block of the TTI includes the common demodulation pilot signal and the dedicated demodulation pilot signal. In this embodiment of the present invention, any resource block of the TTI includes either the common demodulation pilot signal or the dedicated demodulation pilot signal. Therefore, when a resource block of the TTI includes a pilot symbol including the dedicated demodulation pilot signal, the resource block does not include a pilot symbol including the common demodulation pilot signal. In this way, an original pilot symbol including the common demodulation pilot signal in the resource block becomes a non-pilot symbol and a quantity of non-pilot symbols increases. This is conducive to extension of a pilot port.

In a possible design, the TTI includes a first resource block. The first resource block includes the common demodulation pilot signal but does not include the dedicated demodulation pilot signal. The method further includes determining, by the user equipment, before the receiving the pilot signal based on the resource location, frequency band bandwidth in which the common demodulation pilot signal is located in the first resource block. The frequency band bandwidth in which the common demodulation pilot signal is located is less than system frequency band bandwidth of the TTI.

In a current system, the common demodulation pilot signal exists in full bandwidth, to be specific, common pilot exists on each resource block of the full bandwidth. Before sending the pilot signal, the base station configures the frequency band bandwidth in which the common demodulation pilot signal is located in the first resource block. Therefore, if the user equipment is expected to receive the common demodulation pilot signal, the user equipment needs to determine the frequency band bandwidth in which the common demodulation pilot signal is located in the first resource block. The frequency band bandwidth in which the common demodulation pilot signal is located is less than the system frequency band bandwidth of the TTI. In this way, the common demodulation pilot signal occupies only some subcarriers in the first resource block, pilot symbols including the common demodulation pilot signal in the first resource block are reduced when compared with those in a current system, a quantity of non-pilot symbols further increases, and this is conducive to extension of a pilot port.

In a possible design, the first resource block further includes a synchronization pilot signal. The method further includes determining, by the user equipment, before the receiving the pilot signal based on the resource location, resource locations that are in the first resource block and that are used to send the common demodulation pilot signal and the synchronization pilot signal. The common demodulation pilot signal and the synchronization pilot signal are located on different symbols of the first resource block. The synchronization pilot signal is located after the common demodulation pilot signal.

When the first resource block includes the synchronization pilot signal and the common demodulation pilot signal, and before receiving the common demodulation pilot signal, the user equipment determines the resource locations for the common demodulation pilot signal and the synchronization pilot signal in the first resource block. The common demodulation pilot signal and the synchronization pilot signal are located on different symbols of the first resource block. However, in a current system, the common demodulation pilot signal and the synchronization pilot signal may be on a same symbol, the common demodulation pilot signal is in full bandwidth, and the synchronization pilot signal is located on six intermediate PRBs of the system bandwidth. Therefore, compared with a current system, in this embodiment of the present invention, there are more resource locations that do not include a cell-level pilot signal, and this is more conducive to extension of a pilot port.

In a possible design, the first resource block further includes a measurement pilot signal. The method further includes determining, by the user equipment, before the receiving the pilot signal based on the resource location, resource locations that are used to send the common demodulation pilot signal and the measurement pilot signal in the first resource block. The common demodulation pilot signal and the measurement pilot signal are located on different symbols of the first resource block. The measurement pilot signal is located after the common demodulation pilot signal.

When the first resource block includes the measurement pilot signal and the common demodulation pilot signal, and before receiving the pilot signal, the user equipment determines the resource locations for the common demodulation pilot signal and the measurement pilot signal in the first resource block. The common demodulation pilot signal and the measurement pilot signal are located on different symbols of the first resource block. However, in a current system, the common demodulation pilot signal and the synchronization pilot signal may be on a same symbol. Therefore, compared with a current system, in this embodiment of the present invention, a quantity of available subcarriers of a same pilot signal on a same symbol increases, and this is more conducive to extension of a pilot port. In addition, the common demodulation pilot signal is used for channel estimation, and therefore the common demodulation pilot signal is located before the synchronization pilot signal.

In a possible design, the first resource block further includes a positioning pilot signal. The method further includes determining, by the user equipment, before the receiving the pilot signal based on the resource location, resource locations that are used to send the common demodulation pilot signal and the positioning pilot signal in the first resource block. The common demodulation pilot signal and the positioning pilot signal in the first resource block are located on different symbols of the first resource block.

When the first resource block includes the positioning pilot signal and the common demodulation pilot signal, and before receiving the pilot signal, the user equipment determines the resource locations for the common demodulation pilot signal and the positioning pilot signal in the first resource block. The common demodulation pilot signal and the positioning pilot signal are located on different symbols of the first resource block. However, in a current system, the common demodulation pilot signal and the positioning pilot signal may be on a same symbol. Therefore, compared with a current system, in this embodiment of the present invention, a quantity of available subcarriers of a same pilot signal on a same symbol increases, and this is more conducive to extension of a pilot port of the base station.

In a possible design, the TTI includes a second resource block. The second resource block includes the dedicated demodulation pilot signal but does not include the common demodulation pilot signal. The second resource block further includes a measurement pilot signal. The method further includes determining, by the user equipment, before the receiving the pilot signal based on the resource location, resource locations that are used to send the dedicated demodulation pilot signal and the measurement pilot signal in the second resource block. The dedicated demodulation pilot signal and the measurement pilot signal are located on different symbols of the second resource block. The measurement pilot signal is located after the dedicated demodulation pilot signal.

When the second resource block (both the second resource block and the first resource block are resource blocks of the TTI, and the first resource block and the second resource block are different) includes the measurement pilot signal and the dedicated demodulation pilot signal, before receiving the pilot signal, the user equipment determines the resource locations for the dedicated demodulation pilot signal and the measurement pilot signal in the second resource block. The dedicated demodulation pilot signal and the measurement pilot signal are located on different symbols of the second resource block. However, in a current system, the dedicated demodulation pilot signal and the measurement pilot signal may be on a same symbol. Therefore, compared with a current system, in this embodiment of the present invention, a quantity of available subcarriers of a same pilot signal on a same symbol increases, and this is more conducive to extension of a pilot port of the base station. In addition, the dedicated demodulation pilot signal is used for channel estimation. Therefore, to reduce a data demodulation delay, the dedicated demodulation pilot signal is located at the front of the TTI, and the dedicated demodulation pilot signal is located before the measurement pilot signal.

In a possible design, the dedicated demodulation pilot signal is divided into a first part and an $L^{th}$ part. L is a positive integer that is not less than 2. The measurement pilot signal is located after the first part of the dedicated demodulation pilot signal.

In some scenarios such as a high-speed scenario, a quantity of symbols for the dedicated demodulation pilot signal may increase. To be specific, the dedicated demodulation pilot signal may be divided into the first part and the $L^{th}$ part. The first part of the dedicated demodulation pilot signal is used for channel estimation. The $L^{th}$ part of the dedicated demodulation pilot signal assists with channel estimation. Therefore, the measurement pilot signal needs to be located after the first part of the dedicated demodulation pilot signal. The $L^{th}$ part of the dedicated demodulation pilot signal may be located between the first part of the dedicated demodulation pilot signal and the measurement pilot signal, or may be located after the measurement pilot signal.

In a possible design, the second resource block further includes a positioning pilot signal. The method further includes determining, by the user equipment, after the determining resource locations that are used to send the dedicated demodulation pilot signal and the measurement pilot signal in the second resource block, a resource location for the positioning pilot signal. The positioning pilot signal, the dedicated demodulation pilot signal, and the measurement pilot signal are located on different symbols. The positioning pilot signal is located after the dedicated demodulation pilot signal and the measurement pilot signal.

When the second resource block includes the measurement pilot signal and the dedicated demodulation pilot signal, and further includes the positioning pilot signal, the resource location for the positioning pilot signal is determined after the resource locations for the dedicated demodulation pilot signal and the measurement pilot signal are determined and before the user equipment sends the dedicated demodulation pilot signal and the measurement pilot signal. The positioning pilot signal, the dedicated demodulation pilot signal, and the measurement pilot signal are located on different symbols, and the positioning pilot signal is located after the dedicated demodulation pilot signal and the measurement pilot signal. Compared with a current system, in this embodiment of the present invention, there are more non-pilot symbols, and this is more conducive to extension of a pilot port.

A third aspect of embodiments of the present invention provides a base station. The base station includes a determining module. The determining module is configured to determine a resource location that is in a TTI and that is used to send a pilot signal. The pilot signal includes a common demodulation pilot signal and a dedicated demodulation pilot signal. The dedicated demodulation pilot signal and the common demodulation pilot signal are located on different resource blocks of the TTI. The base station further includes a sending module, configured to send the pilot signal at the resource location used to send the pilot signal.

When the base station and user equipment in a communications system transmit data, before the sending module sends the pilot signal (including the common demodulation pilot signal and the dedicated demodulation pilot signal) to the user equipment, the determining module needs to first determine the resource location for the pilot signal in the TTI. The dedicated demodulation pilot signal and the common demodulation pilot signal are located on different resource blocks of the TTI. Then, the sending module sends the pilot signal at the determined resource location used to send the pilot signal. A rule of determining, by the determining module, the resource location that is in the TTI and that is used to send the pilot signal may be known by both the base station and the user equipment, or is notified to the user equipment before the sending module sends the pilot signal, so that the user equipment can receive the pilot signal. In a current system, each resource block of the TTI includes the common demodulation pilot signal and the dedicated demodulation pilot signal. However, in this embodiment of the present invention, a resource block of the TTI includes either the common demodulation pilot signal or the dedicated demodulation pilot signal. Therefore, when a resource block includes a pilot symbol including the dedicated demodulation pilot signal, the resource block does not include a pilot symbol including the common demodulation pilot signal. In this way, an original pilot symbol including the common demodulation pilot signal in the resource block becomes a non-pilot symbol, a quantity of non-pilot symbols increases, and apparently this is conducive to extension of a pilot port.

In a possible design, the TTI includes a first resource block. The first resource block includes the common demodulation pilot signal but does not include the dedicated demodulation pilot signal. The base station further includes a configuration module. The configuration module is configured to configure frequency band bandwidth in which the common demodulation pilot signal is located in the first resource block, so that the frequency band bandwidth in which the common demodulation pilot signal is located is less than system frequency band bandwidth of the TTI.

In a current system, the common demodulation pilot signal exists in full bandwidth, to be specific, common pilot exists on each resource block of the full bandwidth. Therefore, before the transceiver module of the base station sends the common demodulation pilot signal based on the resource location for the common demodulation pilot signal, the configuration module configures the frequency band bandwidth in which the common demodulation pilot signal is located in the first resource block. The configuration causing the frequency band bandwidth in which the common demodulation pilot signal is located to be less than the system frequency band bandwidth of the TTI. In this way, the common demodulation pilot signal occupies only some resource blocks of the TTI. To be specific, first resource blocks are reduced when compared with those in a current system, a quantity of resource blocks that do not include the common demodulation pilot signal increases. This is conducive to flexible use of a frequency band resource and extension of a pilot port.

In a possible design, the first resource block further includes a synchronization pilot signal. The determining module is further configured to determine resource locations that are used to send the common demodulation pilot signal and the synchronization pilot signal in the first resource block. The common demodulation pilot signal and the synchronization pilot signal are located on different symbols of the first resource block. The synchronization pilot signal is located after the common demodulation pilot signal.

Both the common demodulation pilot signal and the synchronization pilot signal are cell-level pilot signals, the common demodulation pilot signal and the synchronization pilot signal are at a same resource location, and the first resource block includes the synchronization pilot signal and the common demodulation pilot signal. Before the sending module sends the pilot signal, the processing module of the base station determines the resource locations for the common demodulation pilot signal and the synchronization pilot signal in the first resource block. The common demodulation pilot signal and the synchronization pilot signal are located on different symbols of the first resource block, and the synchronization pilot signal is located after the common demodulation pilot signal. However, in a current system, the common demodulation pilot signal is in full bandwidth, and the synchronization pilot signal is located on six intermediate PRBs of the system bandwidth. Compared with a current system, in this embodiment of the present invention, there are more resource blocks that do not include a cell-level pilot signal, and this is more conducive to extension of a pilot port. In addition, the common demodulation pilot signal is used for channel estimation, and therefore the common demodulation pilot signal is located before the synchronization pilot signal.

In a possible design, the first resource block further includes a measurement pilot signal. The determining module is further configured to determine resource locations that are used to send the common demodulation pilot signal and the measurement pilot signal in the first resource block. The common demodulation pilot signal and the measurement pilot signal are located on different symbols of the first resource block, and the measurement pilot signal is located after the common demodulation pilot signal.

When the first resource block includes the measurement pilot signal and the common demodulation pilot signal, and before the sending module sends the pilot signal, the determining module determines the resource locations for the common demodulation pilot signal and the measurement pilot signal in the first resource block. The common demodulation pilot signal and the measurement pilot signal are located on different symbols of the first resource block. However, in a current system, the common demodulation pilot signal and the synchronization pilot signal may be on a same symbol. Therefore, compared with a current system, in this embodiment of the present invention, a quantity of available subcarriers of a same pilot signal on a same symbol increases, and this is more conducive to extension of a pilot port. In addition, the common demodulation pilot signal is used for channel estimation, and therefore the common demodulation pilot signal is located before the measurement pilot signal.

In a possible design, the first resource block further includes a positioning pilot signal. The determining module is further configured to determine resource locations that are used to send the common demodulation pilot signal and the positioning pilot signal in the first resource block. The common demodulation pilot signal and the positioning pilot signal in the first resource block are located on different symbols of the first resource block.

When the first resource block includes the positioning pilot signal and the common demodulation pilot signal, and before the sending module sends the pilot signal, the determining module determines the resource locations for the common demodulation pilot signal and the positioning pilot signal in the first resource block. The common demodulation pilot signal and the positioning pilot signal are located on different symbols of the first resource block. However, in a current system, the common demodulation pilot signal and the positioning pilot signal may be on a same symbol. Therefore, compared with a current system, in this embodiment of the present invention, a quantity of available subcarriers of a same pilot signal on a same symbol increases, and this is conducive to extension of a pilot port.

In a possible design, the TTI includes a second resource block. The second resource block includes the dedicated demodulation pilot signal but does not include the common demodulation pilot signal. The second resource block further includes a measurement pilot signal. The determining module is further configured to determine resource locations that are used to send the dedicated demodulation pilot signal and the measurement pilot signal in the second resource block. The dedicated demodulation pilot signal and the measurement pilot signal are located on different symbols of the second resource block. The measurement pilot signal is located after the dedicated demodulation pilot signal.

When the second resource block includes the measurement pilot signal and the dedicated demodulation pilot signal, and before the sending module sends the dedicated demodulation pilot signal, the determining module determines the resource locations for the dedicated demodulation pilot signal and the measurement pilot signal in the second resource block. The dedicated demodulation pilot signal and the measurement pilot signal are located on different symbols of the second resource block. However, in a current system, the dedicated demodulation pilot signal and the measurement pilot signal may be on a same symbol. Therefore, compared with a current system, in this embodiment of the present invention, there are more non-pilot symbols, and this is more conducive to extension of a pilot port. In addition, the dedicated demodulation pilot signal is used for channel estimation, and therefore to reduce a data demodulation delay, the dedicated demodulation pilot signal is located at the front of the TTI, and the dedicated demodulation pilot signal is located before the measurement pilot signal.

In a possible design, the dedicated demodulation pilot signal is divided into a first part and an $L^{th}$ part. L is a positive integer that is not less than 2. The measurement pilot signal is located after the first part of the dedicated demodulation pilot signal.

In a current system, in some scenarios such as a high-speed scenario, a quantity of symbols for the dedicated demodulation pilot signal may increase. To be specific, the dedicated demodulation pilot signal may be divided into the first part and the $L^{th}$ part. The first part of the dedicated demodulation pilot signal is used for channel estimation, and the $L^{th}$ part of the dedicated demodulation pilot signal assists with channel estimation. Therefore, the measurement pilot signal needs to be located after the first part of the dedicated demodulation pilot signal, and the $L^{th}$ part of the dedicated demodulation pilot signal may be located between the first part of the dedicated demodulation pilot signal and the measurement pilot signal, or may be located after the measurement pilot signal.

In a possible design, the second resource block further includes a positioning pilot signal. The determining module is further configured to determine a resource location used to send the positioning pilot signal. The positioning pilot signal, the dedicated demodulation pilot signal, and the measurement pilot signal are located on different symbols, and the positioning pilot signal is located after the dedicated demodulation pilot signal and the measurement pilot signal.

When the second resource block includes the measurement pilot signal and the dedicated demodulation pilot signal, and further includes the positioning pilot signal, the determining module further needs to determine the resource location for the positioning pilot signal after the determining module determines the resource locations for the dedicated demodulation pilot signal and the measurement pilot signal and before the sending module sends the dedicated demodulation pilot signal and the measurement pilot signal. The positioning pilot signal, the dedicated demodulation pilot signal, and the measurement pilot signal are located on different symbols. Compared with a current system, in this embodiment of the present invention, a quantity of available subcarriers of a same pilot signal on a same symbol increases, and this is more conducive to extension of a pilot port of the base station. The positioning pilot signal is located after the dedicated demodulation pilot signal and the measurement pilot signal.

A fourth aspect of embodiments of the present invention provides user equipment including a determining module. The determining module is configured to determine a resource location that is in a TTI and that is used to send a pilot signal. The pilot signal includes a common demodulation pilot signal and a dedicated demodulation pilot signal. The dedicated demodulation pilot signal and the common demodulation pilot signal are located on different resource blocks of the TTI. The user equipment further includes a receiving module, configured to receive the pilot signal based on the resource location used to send the pilot signal.

In a communications system, if the receiving module is required to receive the pilot signal sent by a base station, the determining module needs to learn, in advance, the resource location that is determined by the base station and that is used to send the pilot signal in the TTI. A rule of determining, by the base station, the resource location for the pilot signal may be known by both the base station and the user equipment, or before sending the pilot signal, the base station notifies, to the user equipment, the resource location used to send the pilot signal. After the determining module determines the resource location that is in the TTI and that is used to send the pilot signal, the receiving module may receive the pilot signal sent by the base station. In a current system, each resource block of the TTI includes the common demodulation pilot signal and the dedicated demodulation pilot signal. However, in this embodiment of the present invention, any resource block of the TTI includes either the common demodulation pilot signal or the dedicated demodulation pilot signal. Therefore, when a resource block of the TTI includes a pilot symbol including the common demodulation pilot signal, the resource block does not include a pilot symbol including the dedicated demodulation pilot signal. In this way, an original pilot symbol including the dedicated demodulation pilot signal in the resource block becomes a non-pilot symbol. Consequently, a quantity of non-pilot symbols increases. This is conducive to extension of a pilot port in the communications system.

In a possible design, the TTI includes a first resource block. The first resource block includes the common demodulation pilot signal but does not include the dedicated demodulation pilot signal. The determining module is further configured to determine frequency band bandwidth in which the common demodulation pilot signal is located in the first resource block, so that the frequency band bandwidth in which the common demodulation pilot signal is located is less than system frequency band bandwidth of the TTI.

In a current system, the common demodulation pilot signal exists in full bandwidth, to be specific, common pilot exists on each resource block of the full bandwidth. Before sending the pilot signal, the base station configures the frequency band bandwidth in which the common demodulation pilot signal is located in the first resource block. Therefore, if the receiving module is expected to receive the common demodulation pilot signal, the determining module needs to determine the frequency band bandwidth in which the common demodulation pilot signal is located in the first resource block. The frequency band bandwidth in which the common demodulation pilot signal is located is less than the system frequency band bandwidth of the TTI. In this way, the common demodulation pilot signal occupies only some resource blocks. To be specific, first resource blocks are reduced when compared with those in a current system, a quantity of resource blocks that do not include the common demodulation pilot signal increases, and this is conducive to flexible use of a frequency band resource and extension of a pilot port.

In a possible design, the first resource block further includes a synchronization pilot signal. The determining module is further configured to determine resource locations that are used to send the common demodulation pilot signal and the synchronization pilot signal in the first resource block. The common demodulation pilot signal and the synchronization pilot signal are located on different symbols of the first resource block. The synchronization pilot signal is located after the common demodulation pilot signal.

When the first resource block includes the synchronization pilot signal and the common demodulation pilot signal, and before the receiving module receives the common demodulation pilot signal, the determining module determines the resource locations for the common demodulation pilot signal and the synchronization pilot signal in the first resource block. The common demodulation pilot signal and the synchronization pilot signal are located on different symbols of the first resource block. However, in a current system, the common demodulation pilot signal and the synchronization pilot signal may be on a same symbol, the common demodulation pilot signal is in full bandwidth, and the synchronization pilot signal is located on six intermediate PRBs of the system bandwidth. Therefore, compared with a current system, in this embodiment of the present invention, there are more resource blocks that do not include a cell-level pilot signal, and this is more conducive to extension of a pilot port.

In a possible design, the first resource block further includes a measurement pilot signal. The determining module is further configured to determine resource locations that are used to send the common demodulation pilot signal and the measurement pilot signal in the first resource block, where the common demodulation pilot signal and the measurement pilot signal are located on different symbols of the first resource block.

When the first resource block includes the measurement pilot signal and the common demodulation pilot signal, and before the receiving module receives the common demodulation pilot signal, the determining module determines the resource locations for the common demodulation pilot signal and the measurement pilot signal in the first resource block. The common demodulation pilot signal and the measurement pilot signal are located on different symbols of the first resource block. However, in a current system, the common demodulation pilot signal and the synchronization pilot signal may be on a same symbol. Therefore, compared with a current system, in this embodiment of the present invention, a quantity of available subcarriers of a same pilot signal on a same symbol increases, there are more non-pilot symbols, and this is more conducive to extension of a pilot port of the user equipment.

In a possible design, the first resource block further includes a positioning pilot signal. The determining module is further configured to determine resource locations that are used to send the common demodulation pilot signal and the positioning pilot signal in the first resource block. The common demodulation pilot signal and the positioning pilot signal in the first resource block are located on different symbols of the first resource block. The positioning pilot signal is located after the common demodulation pilot signal.

When the first resource block includes the positioning pilot signal and the common demodulation pilot signal, and before the receiving module receives the common demodulation pilot signal, the determining module determines the resource locations for the common demodulation pilot signal and the positioning pilot signal in the first resource block. The common demodulation pilot signal and the positioning pilot signal are located on different symbols of the first resource block. However, in a current system, the common demodulation pilot signal and the positioning pilot signal may be on a same symbol. Therefore, compared with a current system, in this embodiment of the present invention, there are more non-pilot symbols, and this is more conducive to extension of a pilot port of the user equipment. In addition, the common demodulation pilot signal is used for channel estimation, and therefore the common demodulation pilot signal needs to be located before the positioning pilot signal.

In a possible design, the TTI includes a second resource block. The second resource block includes the dedicated demodulation pilot signal but does not include the common demodulation pilot signal. The second resource block further includes a measurement pilot signal. The determining module is further configured to determine resource locations that are used to send the dedicated demodulation pilot signal and the measurement pilot signal in the second resource block. The dedicated demodulation pilot signal and the measurement pilot signal are located on different symbols of the second resource block. The measurement pilot signal is located after the dedicated demodulation pilot signal.

When the second resource block (both the second resource block and the first resource block are resource blocks of the TTI, and the first resource block and the second resource block are different) includes the measurement pilot signal and the dedicated demodulation pilot signal, and before the receiving module receives the dedicated demodulation pilot signal, the determining module determines the resource locations for the dedicated demodulation pilot signal and the measurement pilot signal in the second resource block. The dedicated demodulation pilot signal and the measurement pilot signal are located on different symbols of the second resource block. However, in a current system, the dedicated demodulation pilot signal and the measurement pilot signal may be on a same symbol. Therefore, compared with a current system, in this embodiment of the present invention, there are more non-pilot symbols, and this is more conducive to extension of a pilot port of the user equipment. In addition, the dedicated demodulation pilot signal is used for channel estimation, and therefore to reduce a data demodulation delay, the dedicated demodulation pilot signal is located before the measurement pilot signal.

In a possible design, the dedicated demodulation pilot signal is divided into a first part and an $L^{th}$ part. L is a positive integer that is not less than 2. The measurement pilot signal is located after the first part of the dedicated demodulation pilot signal.

In a current system, the dedicated demodulation pilot signal is divided into the first part and the $L^{th}$ part. The first part of the dedicated demodulation pilot signal is used for channel estimation, and the $L^{th}$ part of the dedicated demodulation pilot signal assists with channel estimation. Therefore, the measurement pilot signal is located after the first part of the dedicated demodulation pilot signal, and the $L^{th}$ part of the dedicated demodulation pilot signal may be located between the first part of the dedicated demodulation pilot signal and the measurement pilot signal, or may be located after the measurement pilot signal.

In a possible design, the second resource block further includes a positioning pilot signal. The determining module is further configured to determine a resource location used to send the positioning pilot signal. The positioning pilot signal, the dedicated demodulation pilot signal, and the measurement pilot signal are located on different symbols, and the positioning pilot signal is located after the dedicated demodulation pilot signal and the measurement pilot signal.

When the second resource block includes the measurement pilot signal and the dedicated demodulation pilot signal, and further includes the positioning pilot signal, the determining module further needs to determine the resource location for the positioning pilot signal after the determining module determines the resource locations for the dedicated demodulation pilot signal and the measurement pilot signal and before the receiving module receives the dedicated demodulation pilot signal and the measurement pilot signal. The positioning pilot signal, the dedicated demodulation pilot signal, and the measurement pilot signal are located on different symbols, and the positioning pilot signal is located after the dedicated demodulation pilot signal and the measurement pilot signal. Compared with a current system, in this embodiment of the present invention, there are more non-pilot symbols, and this is more conducive to extension of a pilot port of the user equipment.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1:
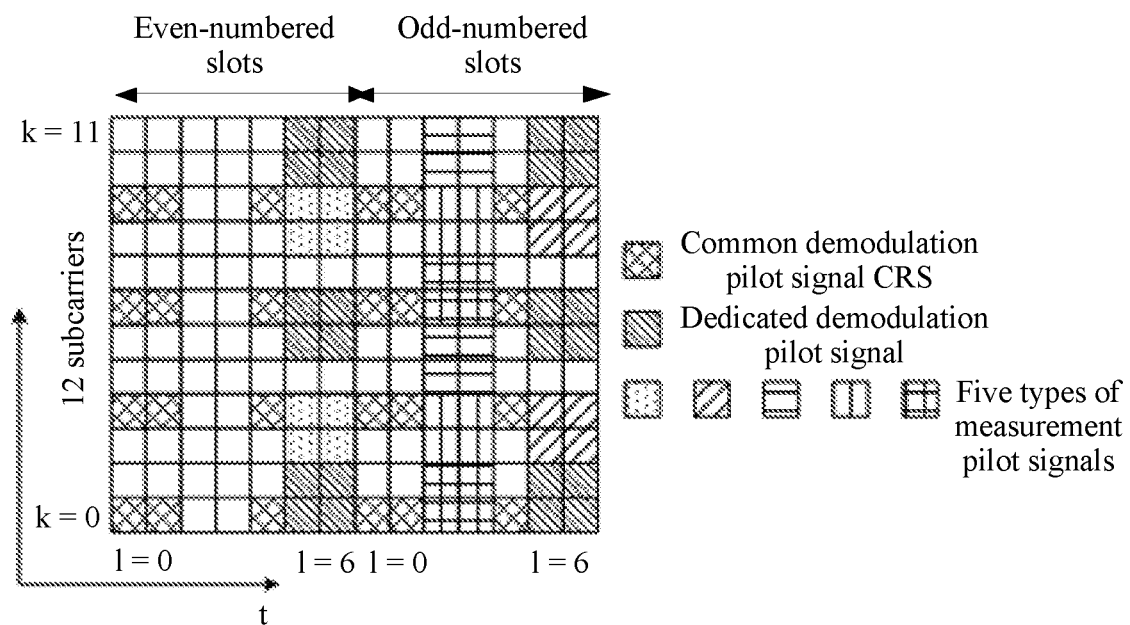
FIG. 1 is a diagram of a pilot signal in a TTI whose length is 1 ms in a current system.
Figure 2:
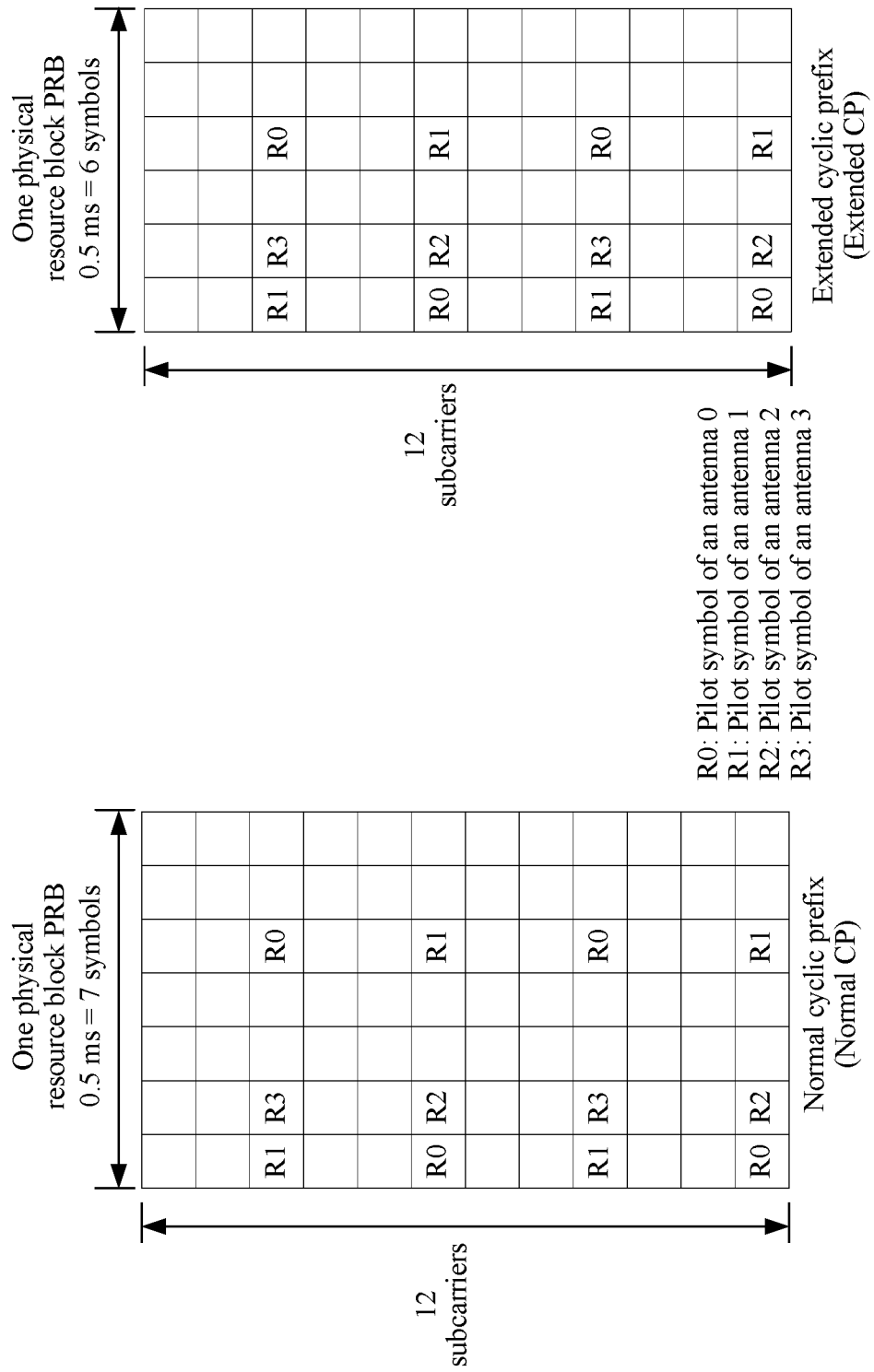
FIG. 2 is a diagram of a pilot symbol of one PRB in a case of four antennas in a current system.

This application provides a pilot signal transmission method, a base station, and user equipment. A dedicated demodulation pilot signal and a common demodulation pilot signal in a TTI may be configured on different resource blocks of the TTI, thereby reducing a quantity of pilot symbols in the TTI, and facilitating extension of a pilot port in a communications system.

The following clearly and completely describes the technical solutions in this application with reference to the accompanying drawings in this application. Apparently, the described embodiments are merely a part rather than all of the embodiments of the present invention. All other embodiments obtained by persons skilled in the art based on the embodiments of this application without creative efforts shall fall within the protection scope of this application.

First, a system architecture or a scenario in which the embodiments of the present invention is applied is briefly described.

Embodiments of the present invention are applied to a wireless communications system, and in particular, to an LTE system or an LTE-A system. After a base station is disabled, the base station still periodically sends a DRS. Because of sparsity of the DRS, the DRS has little impact on power consumption and interference. User equipment always searches for a DRS during movement. If the DRS is detected, it indicates that the user equipment has entered coverage of a base station, and may further enable a mechanism such as uplink paging to wake up the base station to serve the user equipment. Alternatively, if the base station is not disabled, the base station periodically sends pilot signals such as a PSS and an SSS, and the user equipment implements symbol timing and frequency synchronization using the received PSS, and identifies a cell (that is, the base station) ID by combining the PSS with the SSS. After a plurality of user equipments access the base station, PDSCHs/PUSCHs established between the user equipments and the base station all are shared channels. The sharing means that the plurality of user equipments can use the channel at the same time. The base station needs to determine, in each TTI based on channel quality of the user equipments, to schedule which user equipments and to allocate how many resources (such as power and code) to the user equipments. To better adapt to a channel change, the base station needs to perform scheduling in each TTI. In a TTI in which the base station and the user equipment perform transmission with each other, a UL DMRS and a DL DMRS are used as dedicated demodulation pilot signals, a CRS is used as a common demodulation pilot signal, a CSI-RS and an SRS are used as measurement pilot signals, a PRS and a DRS are used as positioning pilot signals, and a PSS and an SSS are used as synchronization pilot signals. Each PRB of each TTI includes a CRS, and the CRS exists in full bandwidth. Currently, a TTI in the LTE system is defined as 1 millisecond (ms). The TTI may be of another length. For example, a length of a TTI in a 5G communications system may change, and the length of the TTI may be 125 μs, 250 μs, 500 μs, 750 μs, or 1 ms.

Figure 3:
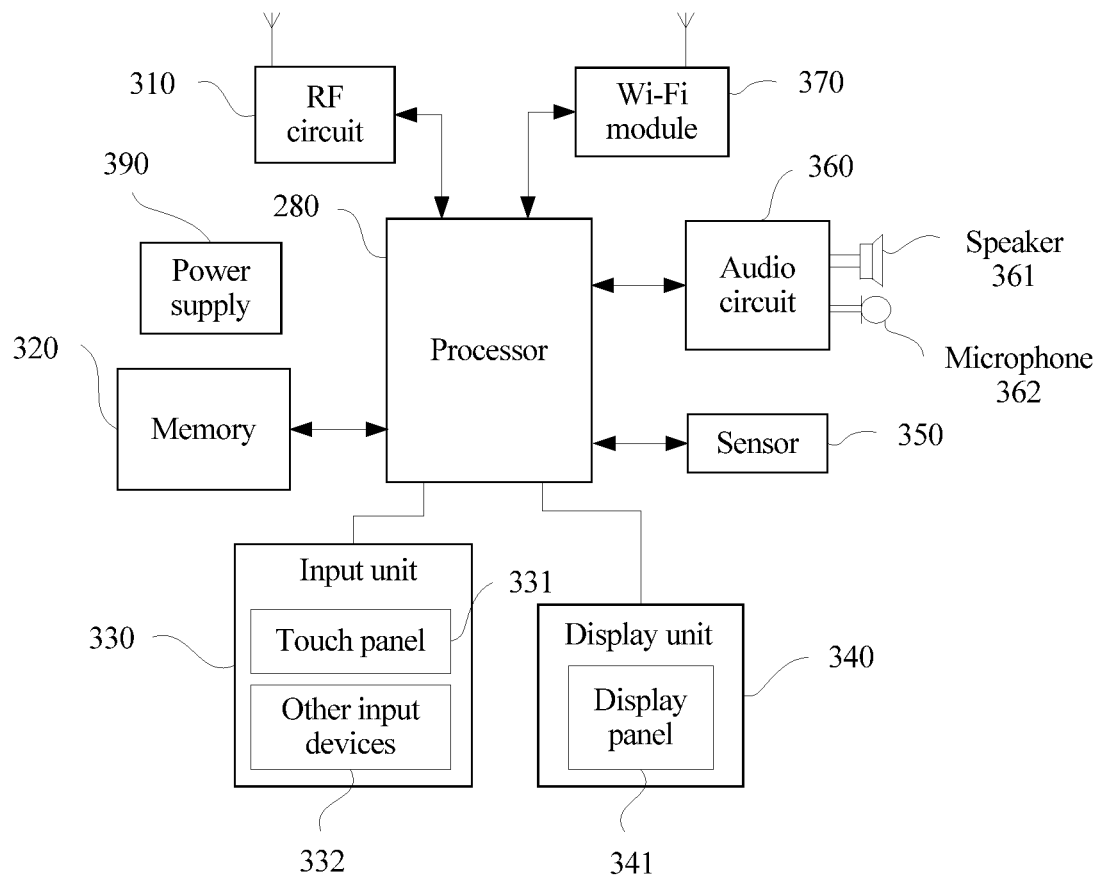
FIG. 3 is a schematic structural diagram of an entity apparatus of user equipment according to this application.

An example in which a user terminal is a mobile phone is used. A block diagram of a partial structure of the mobile phone is shown in FIG. 3. The mobile phone includes components such as a radio frequency (RF) circuit 310, a memory 320, an input unit 330, a display unit 340, a sensor 350, an audio circuit 360, a Wireless Fidelity (WiFi) module 370, a processor 380, and a power supply 390. Persons skilled in the art may understand that, the structure of the mobile phone shown in FIG. 3 does not constitute a limitation on the mobile phone, and the mobile phone may include more or fewer components than those shown in the figure, or combine some components, or have different component arrangements.

All components of the mobile phone are described in detail with reference to FIG. 3.

The RF circuit 310 may be configured to receive and send a signal in an information receiving or sending process or a call process. In particular, after receiving downlink information of a base station, the RF circuit 310 sends the downlink information to the processor 380 for processing, and in addition, sends related uplink data to the base station. Generally, the RF circuit 310 includes but is not limited to an antenna, at least one amplifier, a transceiver, a coupler, a low noise amplifier (LNA), a duplexer, and the like. In addition, the RF circuit 310 may further communicate with a network and another device through wireless communication. The wireless communication may use any communications standard or protocol, including but not limited to Global System for Mobile Communications (GSM), a general packet radio service (GPRS), Code Division Multiple Access (CDMA), Wideband Code Division Multiple Access (WCDMA), LTE, an e-mail, a short message service (SMS), and the like.

The memory 320 may be configured to store a software program and a module. The processor 380 performs various function applications of the mobile phone and data processing by running the software program and the module stored in the memory 320. The memory 320 may mainly include a program storage area and a data storage area. The program storage area may store an operating system, an application program required by at least one function (such as a sound playing function or an image playing function), and the like. The data storage area may store data (such as audio data or a phone book) created based on use of the mobile phone, and the like. In addition, the memory 320 may include a high-speed random access memory, and may further include a non-volatile memory, for example, at least one magnetic disk storage device, a flash memory device, or another volatile solid-state storage device.

The input unit 330 may be configured to receive entered digit or character information. The input unit 330 may be further configured to generate key signal input related to user setting and function control of the mobile phone. Specifically, the input unit 330 may include a touch panel 331 and other input devices 332. The touch panel 331, also referred to as a touchscreen, can collect a touch operation (for example, an operation performed by the user on the touch panel 331 or near the touch panel 331 using any appropriate object or accessory such as a finger or a stylus) of the user on or near the touch panel 331, and drive a corresponding connection apparatus based on a preset program. Optionally, the touch panel 331 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch point coordinates, then sends the touch point coordinates to the processor 380, and can receive and perform a command sent by the processor 380. In addition, the touch panel 331 may be implemented using a plurality of types, such as a resistive type, a capacitive type, an infrared ray, and a surface acoustic wave. In addition to the touch panel 331, the input unit 330 may include the other input devices 232. Specifically, the other input devices 332 may include but are not limited to one or more of a physical keyboard, a function key (such as a volume control key or an on/off key), a trackball, a mouse, or a joystick.

The display unit 340 may be configured to display information entered by the user or information provided for the user, and various menus of the mobile phone. The display unit 340 may include a display panel 341. Optionally, the display panel 341 may be configured in a form of a liquid crystal display (LCD), an organic light-emitting diode (OLED), or the like. Further, the touch panel 331 may cover the display panel 341. When detecting a touch operation on or near the touch panel 331, the touch panel 331 transmits the touch operation to the processor 280 to determine a type of a touch event, and then the processor 380 provides corresponding visual output on the display panel 341 based on the type of the touch event. In FIG. 3, the touch panel 331 and the display panel 341 are used as two independent components to implement input and output functions of the mobile phone. However, in some embodiments, the touch panel 331 and the display panel 341 may be integrated to implement the input and output functions of the mobile phone.

The mobile phone may further include at least one sensor 350, such as a light sensor, a motion sensor, or another sensor. Specifically, the light sensor may include an ambient light sensor and a proximity sensor. The ambient light sensor may adjust luminance of the display panel 341 based on brightness of ambient light. The proximity sensor may turn off the display panel 341 and/or backlight when the mobile phone moves to an ear of the user. As a type of the motion sensor, an acceleration sensor may detect a value of an acceleration in each direction (generally, three axes), may detect a value and a direction of gravity in a static state, and may be used in an application for identifying a mobile phone posture (such as screen switching between landscape and portrait modes, a related game, or magnetometer posture calibration), a function related to vibration identification (such as a pedometer or a knock), and the like. For the another sensor such as a gyroscope, a barometer, a hygrometer, a thermometer, or an infrared sensor that may be further disposed on the mobile phone, details are not described herein.

The audio circuit 360, a speaker 361, and a microphone 362 may provide an audio interface between the user and the mobile phone. The audio circuit 360 may transmit, to the speaker 361, an electrical signal converted from received audio data, and the speaker 361 converts the electrical signal into a sound signal for output. In addition, the microphone 362 converts a collected sound signal into an electrical signal, and the audio circuit 360 receives the electrical signal, converts the electrical signal into audio data, and outputs the audio data to the processor 280 for processing. Then, the audio data is sent to, for example, another mobile phone, using the RF circuit 310, or the audio data is output to the memory 320 for further processing.

Wi-Fi belongs to a short-distance wireless transmission technology. The mobile phone may help, using the Wi-Fi module 370, the user receive and send an email, browse a web page, access streaming media, and the like. The Wi-Fi module 370 provides wireless broadband Internet access for the user.

The processor 380 is a control center of the mobile phone, uses various interfaces and lines to connect all parts of the entire mobile phone, and performs various functions of the mobile phone and data processing by running or executing the software program and/or the module stored in the memory 320 and invoking data stored in the memory 320, to perform overall monitoring on the mobile phone. Optionally, the processor 380 may include one or more processing units. Preferably, an application processor and a modem processor may be integrated into the processor 380. The application processor mainly processes an operating system, a user interface, an application program, and the like. The modem processor mainly processes wireless communication. It may be understood that the foregoing modem processor may be not integrated into the processor 380.

The mobile phone further includes the power supply 390 (for example, a battery) that supplies power to each component. Preferably, the power supply may be logically connected to the processor 380 using a power management system, to implement functions such as charging management, discharging management, and power consumption management using the power management system.

Although not shown, the mobile phone may further include a camera, a Bluetooth module, and the like, and details are not described herein.

Figure 4:
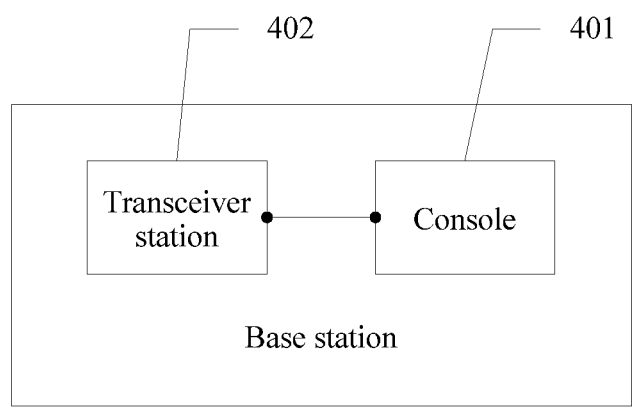
FIG. 4 is a schematic structural diagram of an entity apparatus of a base station according to this application.

FIG. 4 is a schematic structural diagram of a base station according to an embodiment of the present invention. A console 401 is responsible for signal processing, and a transceiver station 402 is responsible for signal sending and receiving.

A transmission link is established between an RF circuit 310 in user equipment and the transceiver station 402 of the base station.

The following separately describes a pilot data transmission method for interaction between a base station and user equipment in the foregoing system architecture or scenario using an embodiment.

Figure 5:
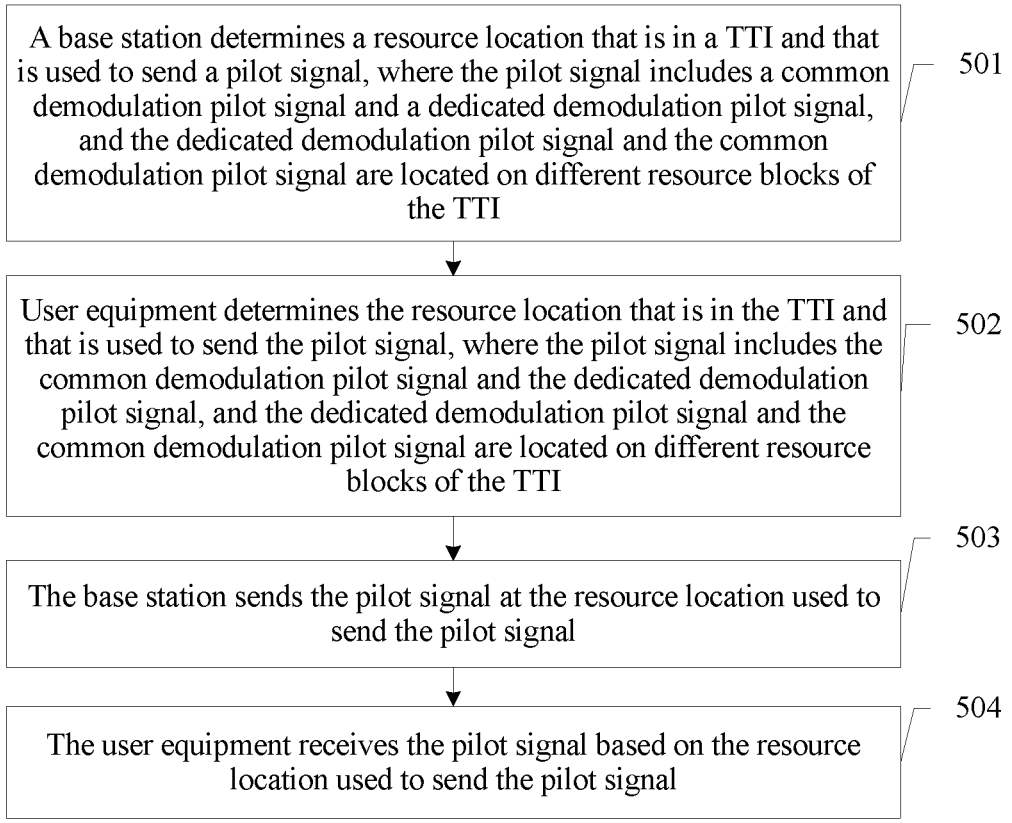
FIG. 5 is a schematic flowchart of an embodiment of a pilot signal transmission method for interaction between a base station and user equipment according to this application.

Referring to FIG. 5, an embodiment of the present invention provides a pilot signal transmission method, including the following steps.

501. A base station determines a resource location that is in a TTI and that is used to send a pilot signal, where the pilot signal includes a common demodulation pilot signal and a dedicated demodulation pilot signal, and the dedicated demodulation pilot signal and the common demodulation pilot signal are located on different resource blocks of the TTI.

Figure 6:
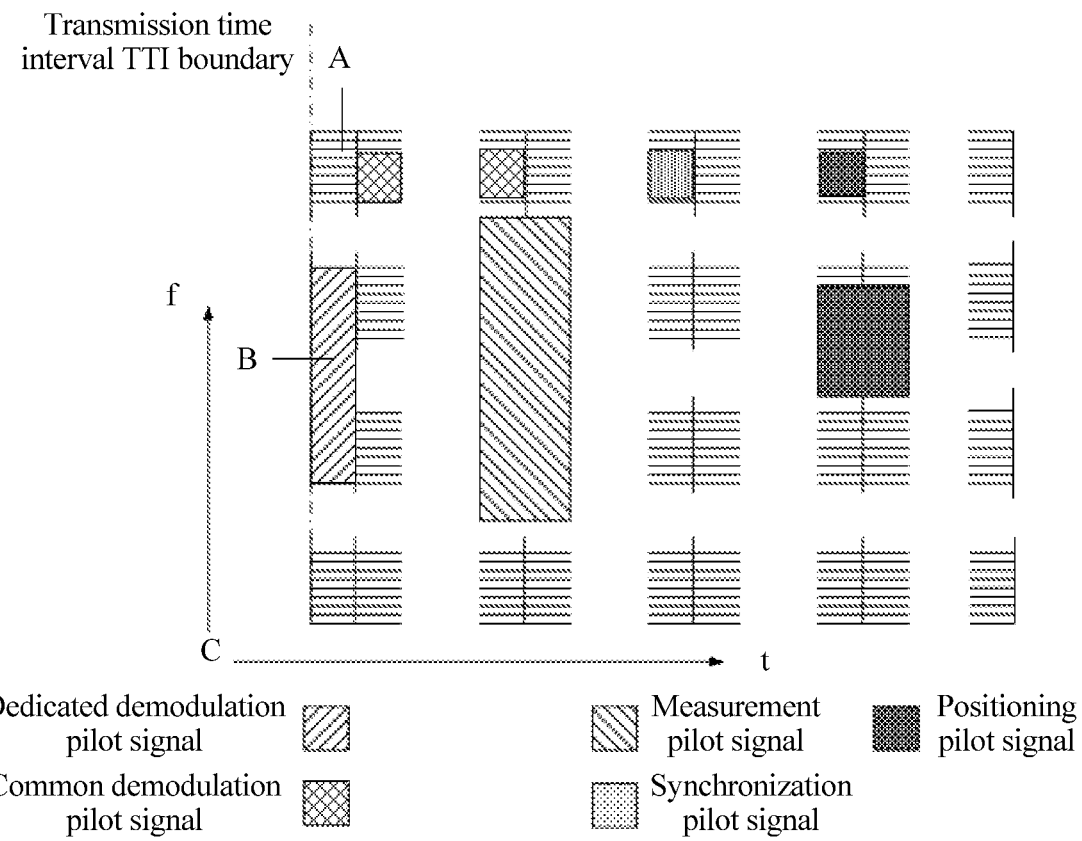
FIG. 6 is a diagram of a pilot signal according to this application.

In this embodiment, when the base station and user equipment in a communications system transmit data, before sending the pilot signal (the common demodulation pilot signal and the dedicated demodulation pilot signal) to the user equipment, the base station determines the resource location used to send the pilot signal, to perform frequency division multiplexing processing on the dedicated demodulation pilot signal and the common demodulation pilot signal. The dedicated demodulation pilot signal and the common demodulation pilot signal are located on different resource blocks of the TTI. FIG. 6 shows an achieved effect. A resource block A carrying the common demodulation pilot signal and a resource block B carrying the dedicated demodulation pilot signal in the TTI are different resource blocks.

502. User equipment determines the resource location that is in the TTI and that is used to send the pilot signal, where the pilot signal includes the common demodulation pilot signal and the dedicated demodulation pilot signal, and the dedicated demodulation pilot signal and the common demodulation pilot signal are located on different resource blocks of the TTI.

In this embodiment, after the base station determines the resource location used to send the pilot signal, to enable the user equipment to receive the pilot signal sent by the base station, the user equipment needs to determine the resource location that is in the TTI and that is used to send the pilot signal. The user equipment may determine, using a preset rule, the resource location that is in the TTI and that is used to send the pilot signal. The preset rule is known by both the base station and the user equipment, or the user equipment receives a notification that is sent by the base station before the base station sends the pilot signal.

503. The base station sends the pilot signal at the resource location used to send the pilot signal.

In this embodiment, after determining the resource location used to send the pilot signal, the base station sends the pilot signal at the determined corresponding resource location.

504. The user equipment receives the pilot signal based on the resource location used to send the pilot signal.

In this embodiment, the user equipment has learned, by performing step 502, that the pilot signal in the TTI is at the resource location, and therefore the user equipment may receive, based on the resource location used to send the pilot signal, the pilot signal sent by the base station.

In a current system, each resource block of the TTI includes the common demodulation pilot signal and the dedicated demodulation pilot signal, but in this embodiment of the present invention, any resource block of the TTI includes either the common demodulation pilot signal or the dedicated demodulation pilot signal. Therefore, when a resource block of the TTI includes a pilot symbol including the dedicated demodulation pilot signal, the resource block does not include a pilot symbol including the common demodulation pilot signal. In this way, an original pilot symbol including the common demodulation pilot signal in the resource block becomes a non-pilot symbol, a quantity of non-pilot symbols increases, and apparently this is conducive to extension of a pilot port.

Optionally, in some embodiments of the present invention, the TTI includes a first resource block, and the first resource block includes the common demodulation pilot signal but does not include the dedicated demodulation pilot signal.

The method further includes, before the base station sends the pilot signal at the resource location used to send the pilot signal, configuring, by the base station, frequency band bandwidth in which the common demodulation pilot signal is located in the first resource block. The configuring causing the frequency band bandwidth in which the common demodulation pilot signal is located to be less than system frequency band bandwidth of the TTI.

The method further includes, before the user equipment receives the pilot signal at the resource location used to send the pilot signal, determining, by the user equipment, the frequency band bandwidth in which the common demodulation pilot signal is located in the first resource block. The frequency band bandwidth in which the common demodulation pilot signal is located being less than the system frequency band bandwidth of the TTI.

In this embodiment of the present invention, the TTI includes the first resource block and a second resource block. Both the first resource block and the second resource block are resource blocks of the TTI, and the first resource block is different from the second resource block. Before sending the common demodulation pilot signal at the resource location used to send the pilot signal, the base station configures the frequency band bandwidth in which the common demodulation pilot signal is located in the first resource block, so that the frequency band bandwidth in which the common demodulation pilot signal is located is less than the system frequency band bandwidth of the TTI. Because the base station configures the frequency band bandwidth in which the common demodulation pilot signal is located in the first resource block, to receive the common demodulation pilot signal, the user equipment further needs to determine the frequency band bandwidth in which the common demodulation pilot signal is located in the first resource block. In a current system, the common demodulation pilot signal exists in full bandwidth, to be specific, common pilot exists on each resource block of the full bandwidth. Therefore, compared with a current system, in this embodiment of the present invention, the common demodulation pilot signal occupies only some resource blocks of the TTI. To be specific, first resource blocks are reduced when compared with those in a current system, a quantity of resource blocks that do not include the common demodulation pilot signal increases, and this is conducive to flexible use of a frequency band resource and extension of a pilot port.

Optionally, in some embodiments of the present invention, the first resource block further includes a synchronization pilot signal.

The method further includes, before the base station sends the pilot signal at the resource location used to send the pilot signal, determining, by the base station, resource locations that are used to send the common demodulation pilot signal and the synchronization pilot signal in the first resource block. The common demodulation pilot signal and the synchronization pilot signal are located on different symbols of the first resource block. The synchronization pilot signal is located after the common demodulation pilot signal.

The method further includes, before the user equipment receives the pilot signal based on the resource location used to send the pilot signal, determining, by the user equipment, the resource locations that are used to send the common demodulation pilot signal and the synchronization pilot signal in the first resource block. The common demodulation pilot signal and the synchronization pilot signal are located on different symbols of the first resource block. The synchronization pilot signal is located after the common demodulation pilot signal.

In this embodiment of the present invention, a symbol location may be a symbol, and the symbol may be an OFDM symbol, an SC-FDMA symbol, or another multiple access symbol. Both the common demodulation pilot signal and the synchronization pilot signal are cell-level pilot signals, and the common demodulation pilot signal and the synchronization pilot signal are on a same resource block. When the first resource block includes the synchronization pilot signal and the common demodulation pilot signal, before sending the pilot signal, the base station determines the resource locations for the common demodulation pilot signal and the synchronization pilot signal in the first resource block. The common demodulation pilot signal and the synchronization pilot signal are located on different symbols of the first resource block, and the synchronization pilot signal is located after the common demodulation pilot signal. Therefore, to receive the common demodulation pilot signal and the synchronization pilot signal, the user equipment further needs to determine the resource locations for the common demodulation pilot signal and the synchronization pilot signal in the first resource block. In a current system, the common demodulation pilot signal is in full bandwidth, and the synchronization pilot signal is located on six intermediate PRBs of the system bandwidth. Therefore, compared with a current system, in this embodiment of the present invention, there are more resource blocks that do not include a cell-level pilot signal, and this is more conducive to extension of a pilot port. In addition, the common demodulation pilot signal is used for channel estimation, and therefore the common demodulation pilot signal is located before the synchronization pilot signal.

Optionally, in some embodiments of the present invention, the first resource block further includes a measurement pilot signal.

The method further includes, before the base station sends the pilot signal at the resource location used to send the pilot signal, determining, by the base station, resource locations that are used to send the common demodulation pilot signal and the measurement pilot signal in the first resource block. The common demodulation pilot signal and the measurement pilot signal are located on different symbols of the first resource block. The measurement pilot signal is located after the common demodulation pilot signal.

The method further includes, before the user equipment receives the pilot signal based on the resource location used to send the pilot signal, determining, by the user equipment, the resource locations that are used to send the common demodulation pilot signal and the measurement pilot signal in the first resource block. The common demodulation pilot signal and the measurement pilot signal are located on different symbols of the first resource block. The measurement pilot signal is located after the common demodulation pilot signal.

In this embodiment of the present invention, when the first resource block includes the measurement pilot signal and the common demodulation pilot signal, before sending the pilot signal, the base station determines the resource locations for the common demodulation pilot signal and the measurement pilot signal in the first resource block. The common demodulation pilot signal and the measurement pilot signal are located on different symbols of the first resource block. To receive the common demodulation pilot signal and the measurement pilot signal, the user equipment further needs to determine the resource locations for the common demodulation pilot signal and the measurement pilot signal in the first resource block. However, in a current system, the common demodulation pilot signal and the synchronization pilot signal may be on a same symbol. Therefore, compared with a current system, in this embodiment of the present invention, a quantity of available subcarriers of a same pilot signal on a same symbol increases, and this is more conducive to extension of a pilot port. In addition, the common demodulation pilot signal is used for channel estimation, and therefore the common demodulation pilot signal is located before the measurement pilot signal.

Optionally, in some embodiments of the present invention, the first resource block further includes a positioning pilot signal.

The method further includes, before the base station sends the pilot signal at the resource location used to send the pilot signal, determining, by the base station, resource locations that are used to send the common demodulation pilot signal and the positioning pilot signal in the first resource block. The common demodulation pilot signal and the positioning pilot signal in the first resource block are located on different symbols of the first resource block.

The method further includes, before the user equipment receives the pilot signal based on the resource location used to send the pilot signal, determining, by the user equipment, the resource locations that are used to send the common demodulation pilot signal and the positioning pilot signal in the first resource block. The common demodulation pilot signal and the positioning pilot signal in the first resource block are located on different symbols of the first resource block.

In this embodiment of the present invention, when the first resource block includes the positioning pilot signal and the common demodulation pilot signal, before sending the pilot signal, the base station determines the resource locations for the common demodulation pilot signal and the positioning pilot signal in the first resource block. The common demodulation pilot signal and the positioning pilot signal are located on different symbols of the first resource block. To receive the common demodulation pilot signal and the positioning pilot signal, the user equipment further needs to determine the resource locations for the common demodulation pilot signal and the positioning pilot signal in the first resource block. However, in a current system, the common demodulation pilot signal and the positioning pilot signal may be on a same symbol. Therefore, compared with a current system, in this embodiment of the present invention, a quantity of available subcarriers of a same pilot signal on a same symbol increases, and this is more conducive to extension of a pilot port.

Optionally, in some embodiments of the present invention, the TTI includes a second resource block, the second resource block includes the dedicated demodulation pilot signal but does not include the common demodulation pilot signal, and the second resource block further includes a measurement pilot signal.

The method further includes, before the base station sends the pilot signal at the resource location used to send the pilot signal, determining, by the base station, resource locations that are used to send the dedicated demodulation pilot signal and the measurement pilot signal in the second resource block. The dedicated demodulation pilot signal and the measurement pilot signal are located on different symbols of the second resource block. The measurement pilot signal is located after the dedicated demodulation pilot signal.

The method further includes, before the user equipment receives the pilot signal based on the resource location used to send the pilot signal, determining, by the user equipment, the resource locations that are used to send the dedicated demodulation pilot signal and the measurement pilot signal in the second resource block. The dedicated demodulation pilot signal and the measurement pilot signal are located on different symbols of the second resource block. The measurement pilot signal is located after the dedicated demodulation pilot signal.

In this embodiment of the present invention, when the second resource block includes the measurement pilot signal and the dedicated demodulation pilot signal, before sending the pilot signal, the base station determines the resource locations for the dedicated demodulation pilot signal and the measurement pilot signal in the second resource block. The dedicated demodulation pilot signal and the measurement pilot signal are located on different symbols of the second resource block. To receive the dedicated demodulation pilot signal and the measurement pilot signal, the user equipment further needs to determine the resource locations for the dedicated demodulation pilot signal and the measurement pilot signal in the first resource block. In a current system, the dedicated demodulation pilot signal and the measurement pilot signal may be on a same symbol. Therefore, compared with a current system, in this embodiment of the present invention, a quantity of available subcarriers of a same pilot signal on a same symbol increases, and this is more conducive to extension of a pilot port. In addition, the dedicated demodulation pilot signal is used for channel estimation, and therefore to reduce a data demodulation delay, the dedicated demodulation pilot signal is located at the front of the TTI, and the dedicated demodulation pilot signal is located before the measurement pilot signal.

Optionally, in some embodiments of the present invention, in some scenarios such as a high-speed scenario, a quantity of symbols for the dedicated demodulation pilot signal may increase. To be specific, the dedicated demodulation pilot signal may be divided into a first part and an $L^{th}$ part, and L is a positive integer that is not less than 2. The first part of the dedicated demodulation pilot signal is used for channel estimation, and the $L^{th}$ part of the dedicated demodulation pilot signal assists with channel estimation. Therefore, the measurement pilot signal needs to be located after the first part of the dedicated demodulation pilot signal, and the $L^{th}$ part of the dedicated demodulation pilot signal may be located between the first part of the dedicated demodulation pilot signal and the measurement pilot signal, or may be located after the measurement pilot signal.

Optionally, in some embodiments of the present invention, the second resource block further includes a positioning pilot signal.

The method further includes, after the base station determines the resource locations that are used to send the dedicated demodulation pilot signal and the measurement pilot signal in the second resource block, determining, by the base station, a resource location used to send the positioning pilot signal. The positioning pilot signal, the dedicated demodulation pilot signal, and the measurement pilot signal are located on different symbols. The positioning pilot signal is located after the dedicated demodulation pilot signal and the measurement pilot signal.

The method further includes, after the user equipment determines the resource locations that are used to send the dedicated demodulation pilot signal and the measurement pilot signal in the second resource block, determining, by the user equipment, the resource location used to send the positioning pilot signal. The positioning pilot signal, the dedicated demodulation pilot signal, and the measurement pilot signal are located on different symbols. The positioning pilot signal is located after the dedicated demodulation pilot signal and the measurement pilot signal.

In this embodiment of the present invention, when the second resource block includes the measurement pilot signal and the dedicated demodulation pilot signal, and further includes the positioning pilot signal, the resource location for the positioning pilot signal further needs to be determined after the resource locations for the dedicated demodulation pilot signal and the measurement pilot signal are determined and before the base station sends the dedicated demodulation pilot signal and the measurement pilot signal. The positioning pilot signal, the dedicated demodulation pilot signal, and the measurement pilot signal are located on different symbols. To receive the positioning pilot signal, the user equipment further needs to determine the resource location for the positioning pilot signal. Compared with a current system, in this embodiment of the present invention, a quantity of available subcarriers of a same pilot signal on a same symbol increases, and this is more conducive to extension of a pilot port of the base station. The positioning pilot signal is located after the dedicated demodulation pilot signal and the measurement pilot signal.

The pilot signal transmission method is described in the foregoing embodiment, and a base station and user equipment are separately described in the following embodiments.

Figure 7:
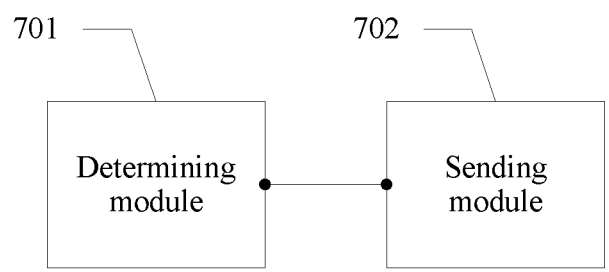
FIG. 7 is a schematic structural diagram of an embodiment of a base station according to this application.

Referring to FIG. 7, an embodiment of the present invention provides a base station, including a determining module 701. The determining module 701 is configured to determine a resource location that is in a TTI and that is used to send a pilot signal. The pilot signal includes a common demodulation pilot signal and a dedicated demodulation pilot signal. The dedicated demodulation pilot signal and the common demodulation pilot signal are located on different resource blocks of the TTI. The base station further includes a sending module 702, configured to send the pilot signal at the resource location used to send the pilot signal.

In this embodiment of the present invention, when the base station and user equipment in a communications system transmit data, before the sending module 702 sends the pilot signal (including the common demodulation pilot signal and the dedicated demodulation pilot signal) to the user equipment, the determining module 701 needs to first determine the resource location for the pilot signal in the TTI. The dedicated demodulation pilot signal and the common demodulation pilot signal are located on different resource blocks of the TTI. Then, the sending module 702 sends the pilot signal at the determined resource location used to send the pilot signal. A rule of determining, by the determining module 701, the resource location that is in the TTI and that is used to send the pilot signal may be known by both the base station and the user equipment, or is notified to the user equipment before the sending module 702 sends the pilot signal, so that the user equipment can receive the pilot signal. In a current system, each resource block of the TTI includes the common demodulation pilot signal and the dedicated demodulation pilot signal, but in this embodiment of the present invention, a resource block of the TTI includes either the common demodulation pilot signal or the dedicated demodulation pilot signal. Therefore, when a resource block includes a pilot symbol including the dedicated demodulation pilot signal, the resource block does not include a pilot symbol including the common demodulation pilot signal. In this way, an original pilot symbol including the common demodulation pilot signal in the resource block becomes a non-pilot symbol, a quantity of non-pilot symbols increases, and apparently this is conducive to extension of a pilot port.

Figure 8:
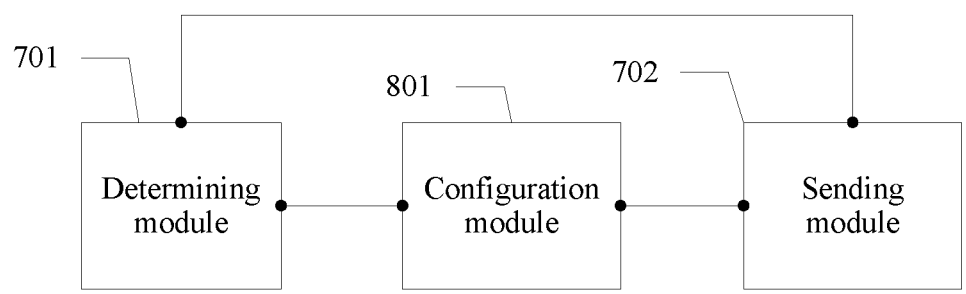
FIG. 8 is a schematic structural diagram of another embodiment of a base station according to this application.

Optionally, as shown in FIG. 8, in some embodiments of the present invention, the TTI includes a first resource block, and the first resource block includes the common demodulation pilot signal but does not include the dedicated demodulation pilot signal. The base station further includes a configuration module 801.

The configuration module 801 is configured to configure frequency band bandwidth in which the common demodulation pilot signal is located in the first resource block, so that the frequency band bandwidth in which the common demodulation pilot signal is located is less than system frequency band bandwidth of the TTI.

Optionally, in some embodiments of the present invention, the first resource block further includes a synchronization pilot signal.

The determining module 701 is further configured to determine resource locations for the common demodulation pilot signal and the synchronization pilot signal in the first resource block, where the common demodulation pilot signal and the synchronization pilot signal are located on different symbols of the first resource block, and the synchronization pilot signal is located after the common demodulation pilot signal.

Optionally, in some embodiments of the present invention, the first resource block further includes a measurement pilot signal.

The determining module 701 is further configured to determine resource locations that are used to send the common demodulation pilot signal and the measurement pilot signal in the first resource block, where the common demodulation pilot signal and the measurement pilot signal are located on different symbols of the first resource block, and the measurement pilot signal is located after the common demodulation pilot signal.

Optionally, in some embodiments of the present invention, the first resource block further includes a positioning pilot signal.

The determining module 701 is further configured to determine resource locations that are used to send the common demodulation pilot signal and the positioning pilot signal in the first resource block, where the common demodulation pilot signal and the positioning pilot signal in the first resource block are located on different symbols of the first resource block.

Optionally, in some embodiments of the present invention, the TTI includes a second resource block, the second resource block includes the dedicated demodulation pilot signal but does not include the common demodulation pilot signal, and the second resource block further includes a measurement pilot signal.

The determining module 701 is further configured to determine resource locations that are used to send the dedicated demodulation pilot signal and the measurement pilot signal in the second resource block, where the dedicated demodulation pilot signal and the measurement pilot signal are located on different symbols of the second resource block, and the measurement pilot signal is located after the dedicated demodulation pilot signal.

Optionally, the dedicated demodulation pilot signal is divided into a first part and an $L^{th}$ part.

The determining module 701 is further configured to determine the resource locations that are used to send the dedicated demodulation pilot signal and the measurement pilot signal in the second resource block, where the dedicated demodulation pilot signal is divided into the first part and the $L^{th}$ part, the dedicated demodulation pilot signal and the measurement pilot signal are located on different symbols of the second resource block, and the measurement pilot signal is located after the $L^{th}$ part of the dedicated demodulation pilot signal.

Optionally, in some embodiments of the present invention, the second resource block further includes a positioning pilot signal.

The determining module 701 is further configured to determine a resource location used to send the positioning pilot signal, where the positioning pilot signal, the dedicated demodulation pilot signal, and the measurement pilot signal are located on different symbols, and the positioning pilot signal is located after the dedicated demodulation pilot signal and the measurement pilot signal.

Figure 9:
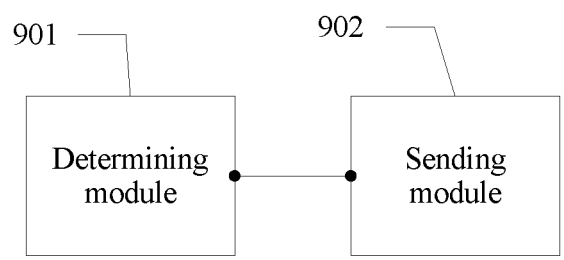
FIG. 9 is a schematic structural diagram of an embodiment of user equipment according to this application.

Referring to FIG. 9, an embodiment of the present invention provides user equipment, including a determining module 901. The determining module 901 is configured to determine a resource location that is in a TTI and that is used to send a pilot signal. The pilot signal includes a common demodulation pilot signal and a dedicated demodulation pilot signal. The dedicated demodulation pilot signal and the common demodulation pilot signal are located on different resource blocks of the TTI. The user equipment further includes a receiving module 902, configured to receive the pilot signal based on the resource location used to send the pilot signal.

In this embodiment of the present invention, in a communications system, if the receiving module 902 is required to receive the pilot signal sent by a base station, the determining module 901 needs to learn, in advance, the resource location that is determined by the base station and that is used to send the pilot signal in the TTI. A rule of determining, by the base station, the resource location used to send the pilot signal may be known by both the base station and the user equipment, or before sending the pilot signal, the base station notifies, to the user equipment, the resource location used to send the pilot signal. After the determining module 901 determines the resource location that is in the TTI and that is used to send the pilot signal, the receiving module 902 may receive the pilot signal sent by the base station. In a current system, each resource block of the TTI includes the common demodulation pilot signal and the dedicated demodulation pilot signal, but in this embodiment of the present invention, any resource block of the TTI includes either the common demodulation pilot signal or the dedicated demodulation pilot signal. Therefore, when a resource block of the TTI includes a pilot symbol including the common demodulation pilot signal, the resource block does not include a pilot symbol including the dedicated demodulation pilot signal. In this way, an original pilot symbol including the dedicated demodulation pilot signal in the resource block becomes a non-pilot symbol, a quantity of non-pilot symbols increases, and apparently this is conducive to extension of a pilot port in the communications system.

Optionally, in some embodiments of the present invention, the TTI includes a first resource block, and the first resource block includes the common demodulation pilot signal but does not include the dedicated demodulation pilot signal.

The determining module 901 is further configured to determine frequency band bandwidth in which the common demodulation pilot signal is located in the first resource block, where the frequency band bandwidth in which the common demodulation pilot signal is located is less than system frequency band bandwidth of the TTI.

Optionally, in some embodiments of the present invention, the first resource block further includes a synchronization pilot signal.

The determining module 901 is further configured to determine resource locations that are used to send the common demodulation pilot signal and the synchronization pilot signal in the first resource block, where the common demodulation pilot signal and the synchronization pilot signal are located on different symbols of the first resource block, and the synchronization pilot signal is located after the common demodulation pilot signal.

Optionally, in some embodiments of the present invention, the first resource block further includes a measurement pilot signal.

The determining module 901 is further configured to determine resource locations that are used to send the common demodulation pilot signal and the measurement pilot signal in the first resource block, where the common demodulation pilot signal and the measurement pilot signal are located on different symbols of the first resource block, and the measurement pilot signal is located after the common demodulation pilot signal.

Optionally, in some embodiments of the present invention, the first resource block further includes a positioning pilot signal.

The determining module 901 is further configured to determine resource locations that are used to send the common demodulation pilot signal and the positioning pilot signal in the first resource block, where the common demodulation pilot signal and the positioning pilot signal in the first resource block are located on different symbols of the first resource block.

Optionally, in some embodiments of the present invention, the TTI includes a second resource block, the second resource block includes the dedicated demodulation pilot signal but does not include the common demodulation pilot signal, and the second resource block further includes a measurement pilot signal.

The determining module 901 is further configured to determine resource locations that are used to send the dedicated demodulation pilot signal and the measurement pilot signal in the second resource block, where the dedicated demodulation pilot signal and the measurement pilot signal are located on different symbols of the second resource block, and the measurement pilot signal is located after the dedicated demodulation pilot signal.

Optionally, the dedicated demodulation pilot signal is divided into a first part and an $L^{th}$ part.

The determining module 901 is further configured to determine the resource locations that are used to send the dedicated demodulation pilot signal and the measurement pilot signal in the second resource block, where the dedicated demodulation pilot signal is divided into the first part and the $L^{th}$ part, the dedicated demodulation pilot signal and the measurement pilot signal are located on different symbols of the second resource block, and the measurement pilot signal is located after the $L^{th}$ part of the dedicated demodulation pilot signal.

Optionally, in some embodiments of the present invention, the second resource block further includes a positioning pilot signal.

The determining module 901 is further configured to determine a resource location used to send the positioning pilot signal, where the positioning pilot signal, the dedicated demodulation pilot signal, and the measurement pilot signal are located on different symbols, and the positioning pilot signal is located after the dedicated demodulation pilot signal and the measurement pilot signal.

As shown in FIG. 3, an embodiment of the present invention provides a user terminal, including an input unit 330, a memory 320, an RF circuit 310, a Wi-Fi module 370, and a processor 380. The input unit 330, the RF circuit 310, the Wi-Fi module 370, and the processor 380 are connected to each other using a bus. The memory 320 stores computer instructions.

The processor 380 determines, by executing the computer instructions, a resource location that is in a TTI and that is used to send a pilot signal, where the pilot signal includes a common demodulation pilot signal and a dedicated demodulation pilot signal, and the dedicated demodulation pilot signal and the common demodulation pilot signal are located on different resource blocks of the TTI.

The RF circuit 310 receives the pilot signal based on the resource location used to send the pilot signal.

As shown in FIG. 4, an embodiment of the present invention provides a base station, including a console 401. The console 401 is configured to determine a resource location that is in a TTI and that is used to send a pilot signal. The pilot signal includes a common demodulation pilot signal and a dedicated demodulation pilot signal. The dedicated demodulation pilot signal and the common demodulation pilot signal are located on different resource blocks of the TTI. The base station further includes a transceiver station 402, configured to send the pilot signal at the resource location used to send the pilot signal.

Interaction between entity apparatuses of the base station and the user equipment is implemented through data sending and receiving between the RF circuit 310 and the transceiver station 402.

In conclusion, the foregoing embodiments are merely intended for describing the technical solutions of the present invention, but not for limiting the present invention.

Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method, comprising:
determining, by a user equipment, a first plurality of resource locations in a transmission time interval (TTI), wherein a first pilot signal is transmitted by a network-side device in the first plurality of resource locations, the first pilot signal comprises a common demodulation pilot signal and a dedicated demodulation pilot signal, the dedicated demodulation pilot signal and the common demodulation pilot signal are transmitted in different resource blocks of the TTI, the TTI comprises a first resource block, the common demodulation pilot signal is transmitted in the first resource block, and the dedicated demodulation pilot signal is transmitted in another resource block that is different than the first resource block;
before receiving the first pilot signal, determining, by the user equipment, a first frequency band bandwidth in which the common demodulation pilot signal is transmitted by the network-side device in the first resource block, wherein the first frequency band bandwidth is less than a system frequency band bandwidth of the TTI; and
receiving, by the user equipment from the network-side device, the first pilot signal based on the first plurality of resource locations.

2. The method according to claim 1, wherein:
the TTI further comprises a second resource block, the dedicated demodulation pilot signal and a measurement pilot signal are transmitted by the network-side device in the second resource block, the common demodulation pilot signal is transmitted by the network-side device in the first resource block, and the first resource block is different than the second resource block; and
the method further comprises:
before receiving the first pilot signal, determining, by the user equipment, a second plurality of resource locations in the second resource block, wherein the dedicated demodulation pilot signal and the measurement pilot signal are transmitted by the network-side device in the second plurality of resource locations, wherein the dedicated demodulation pilot signal and the measurement pilot signal are transmitted in different symbols of the second resource block, and wherein the measurement pilot signal is transmitted after the dedicated demodulation pilot signal.

3. The method according to claim 1, wherein:
a synchronization pilot signal is further transmitted in the first resource block; and
the method further comprises:
before receiving the first pilot signal, determining, by the user equipment, a second plurality of resource locations in the first resource block, wherein the common demodulation pilot signal and the synchronization pilot signal are transmitted by the network-side device in the second plurality of resource locations, wherein the common demodulation pilot signal and the synchronization pilot signal are transmitted in different symbols of the first resource block, and wherein the synchronization pilot signal is transmitted after the common demodulation pilot signal.

4. The method according to claim 1, wherein:
a measurement pilot signal is further transmitted in the first resource block; and
the method further comprises:
before receiving the first pilot signal, determining, by the user equipment, a second plurality of resource locations in the first resource block, wherein the common demodulation pilot signal and the measurement pilot signal are transmitted by the network-side device in the second plurality of resource locations, wherein the common demodulation pilot signal and the measurement pilot signal are transmitted in different symbols of the first resource block, and wherein the measurement pilot signal is transmitted after the common demodulation pilot signal.

5. The method according to claim 1, wherein:
a positioning pilot signal is further transmitted in the first resource block; and
the method further comprises:
before receiving the first pilot signal, determining, by the user equipment, a second plurality of resource locations in the first resource block, wherein the common demodulation pilot signal and the positioning pilot signal are transmitted by the network-side device in the second plurality of resource locations, and wherein the common demodulation pilot signal and the positioning pilot signal are transmitted in different symbols of the first resource block.

6. A base station, comprising:
a processor; and
a non-transitory computer-readable storage medium storing a program to be executed by the processor, the program including instructions for:
determining a first plurality of resource locations in a transmission time interval (TTI), wherein the first plurality of resource locations is for sending a first pilot signal, the first pilot signal comprises a common demodulation pilot signal and a dedicated demodulation pilot signal, wherein the dedicated demodulation pilot signal and the common demodulation pilot signal are transmitted in different resource blocks of the TTI, wherein the TTI comprises a first resource block, wherein the common demodulation pilot signal is transmitted in the first resource block, and wherein the dedicated demodulation pilot signal is transmitted in another resource block that is different than the first resource block;
configuring a first frequency band bandwidth in which the common demodulation pilot signal is transmitted in the first resource block, wherein the first frequency band bandwidth is less than a system frequency band bandwidth of the TTI; and
transmitting, to a user equipment, the first pilot signal in the first plurality of resource locations.

7. The base station according to claim 6, wherein:
the TTI further comprises a second resource block, the dedicated demodulation pilot signal and a measurement pilot signal are transmitted in the second resource block, and the first resource block is different than the second resource block; and
the program further includes instructions for determining a second plurality of resource locations in the second resource block, wherein the dedicated demodulation pilot signal and the measurement pilot signal are transmitted in the second plurality of resource locations, wherein the dedicated demodulation pilot signal and the measurement pilot signal are transmitted in different symbols of the second resource block, and wherein the measurement pilot signal is transmitted after the dedicated demodulation pilot signal.

8. The base station according to claim 6, wherein:
a positioning pilot signal is further transmitted in the first resource block; and
the program further includes instructions for determining a second plurality of resource locations in the first resource block, wherein the common demodulation pilot signal and the positioning pilot signal are transmitted in the second plurality of resource locations, wherein the common demodulation pilot signal and the positioning pilot signal in the first resource block are transmitted in different symbols of the first resource block.

9. The base station according to claim 6, wherein:
the first resource block further comprises a synchronization pilot signal; and
the program further includes instructions for determining a second plurality of resource locations in the first resource block, wherein the common demodulation pilot signal and the synchronization pilot signal are transmitted in the second plurality of resource locations, wherein the common demodulation pilot signal and the synchronization pilot signal are transmitted in different symbols of the first resource block, and wherein the synchronization pilot signal is transmitted after the common demodulation pilot signal.

10. The base station according to claim 6, wherein:
a measurement pilot signal is further transmitted in the first resource block; and
the program further includes instructions for determining a second plurality of resource locations in the first resource block, wherein the common demodulation pilot signal and the measurement pilot signal are transmitted in the second plurality of resource locations, wherein the common demodulation pilot signal and the measurement pilot signal are transmitted in different symbols of the first resource block, and wherein the measurement pilot signal is transmitted after the common demodulation pilot signal.

11. A user equipment, comprising:
a processor; and
a non-transitory computer-readable storage medium storing a program to be executed by the processor, the program including instructions for:
determining a first plurality of resource locations in a transmission time interval (TTI), wherein and a first pilot signal is transmitted by a network-side device in the first plurality of resource locations, wherein the first pilot signal comprises a common demodulation pilot signal and a dedicated demodulation pilot signal, wherein the dedicated demodulation pilot signal and the common demodulation pilot signal are transmitted in different resource blocks of the TTI, wherein the TTI comprises a first resource block, wherein the common demodulation pilot signal is transmitted in the first resource block, and wherein the dedicated demodulation pilot signal is transmitted in another resource block that is different than the first resource block;
determining a first frequency band bandwidth in which the common demodulation pilot signal is transmitted by the network-side device in the first resource block, and wherein the first frequency band bandwidth is less than a system frequency band bandwidth of the TTI; and
receiving, from the network-side device, the first pilot signal based on the first plurality of resource locations.

12. The user equipment according to claim 11, wherein:
the TTI comprises a second resource block, the dedicated demodulation pilot signal and a measurement pilot signal are transmitted in the second resource block, and the first resource block is different than the second resource block; and
the program further includes instructions for determining a second plurality of resource locations in the second resource block, wherein the dedicated demodulation pilot signal and the measurement pilot signal are transmitted in the second plurality of resource locations, wherein the dedicated demodulation pilot signal and the measurement pilot signal are transmitted in different symbols of the second resource block, and wherein the measurement pilot signal is transmitted after the dedicated demodulation pilot signal.

13. The user equipment according to claim 11, wherein:
a positioning pilot signal is further transmitted in the first resource block; and
the program further includes instructions for determining a second plurality of resource locations in the first resource block, wherein the common demodulation pilot signal and the positioning pilot signal are transmitted by the network-side device in the second plurality of resource locations, and wherein the common demodulation pilot signal and the positioning pilot signal are transmitted in different symbols of the first resource block.

14. The user equipment according to claim 11, wherein:
a measurement pilot signal is further transmitted in the first resource block; and
the program further includes instructions for determining a second plurality of resource locations in the first resource block, wherein the common demodulation pilot signal and the measurement pilot signal are transmitted by the network-side device in the second plurality of resource locations, wherein the common demodulation pilot signal and the measurement pilot signal are transmitted in different symbols of the first resource block, and wherein the measurement pilot signal is transmitted after the common demodulation pilot signal.

15. The user equipment according to claim 11, wherein:
a synchronization pilot signal is further transmitted in the first resource block; and
the program further includes instructions for determining a second plurality of resource locations in the first resource block, wherein the common demodulation pilot signal and the synchronization pilot signal are transmitted by the network-side device in the second plurality of resource locations, wherein the common demodulation pilot signal and the synchronization pilot signal are transmitted in different symbols of the first resource block, and wherein the synchronization pilot signal is transmitted after the common demodulation pilot signal.

* * * * *